(12) United States Patent
Zhang et al.

(10) Patent No.: US 12,081,340 B2
(45) Date of Patent: Sep. 3, 2024

(54) HYBRID AUTOMATIC REPEAT REQUEST ACKNOWLEDGEMENT CODEBOOK DETERMINATION METHOD AND DEVICE

(71) Applicants: China Mobile Communication Co., Ltd Research Institute, Beijing (CN); China Mobile Communications Group Co.,Ltd., Beijing (CN)

(72) Inventors: Yi Zhang, Beijing (CN); Liang Xia, Beijing (CN)

(73) Assignee: China Mobile Communication Co., Ltd Research Institute China Mobile Communications Group Co., Ltd., Beijing (CN)

( * ) Notice: Subject to any disclaimer, the term of this patent is extended or adjusted under 35 U.S.C. 154(b) by 74 days.

(21) Appl. No.: 17/775,348

(22) PCT Filed: Oct. 20, 2020

(86) PCT No.: PCT/CN2020/122098
§ 371 (c)(1),
(2) Date: May 9, 2022

(87) PCT Pub. No.: WO2021/088636
PCT Pub. Date: May 14, 2021

(65) Prior Publication Data
US 2022/0385412 A1 Dec. 1, 2022

(30) Foreign Application Priority Data
Nov. 8, 2019 (CN) .......................... 201911089029.0

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1614* (2013.01); *H04L 1/1822* (2013.01); *H04L 5/0055* (2013.01)

(58) Field of Classification Search
CPC ................. H04L 1/1822; H04L 1/1614; H04L 1/1812; H04L 5/0055; H04L 1/1854; H04L 1/1607
See application file for complete search history.

(56) References Cited

U.S. PATENT DOCUMENTS

2018/0294927 A1* 10/2018 Takeda .................. H04L 1/1861
2019/0268803 A1* 8/2019 He ........................ H04W 28/04
(Continued)

FOREIGN PATENT DOCUMENTS

| CN | 110138514 A | 8/2019 |
|---|---|---|
| CN | 110351018 A | 10/2019 |
| EP | 3547593 A1 | 10/2019 |

OTHER PUBLICATIONS

Huawei, Hisilicon, Discussion on HARQ-ACK ordering in case of semi-static codebook configuration for eCA, 3GPP TSG RAN WG1 Meeting#84bis, R1-162104, Apr. 11-15, 2016, Busan, Korea.
(Continued)

*Primary Examiner* — Steve N Nguyen
(74) *Attorney, Agent, or Firm* — Price Heneveld, LLP

(57) ABSTRACT

A method and a device of determining a Hybrid Automatic Repeat reQuest-Acknowledgement are provided. The method includes: determining a first set of candidate PDSCH reception opportunities according to first information; determining HARQ-ACK information or a HARQ-ACK codebook transmitted on PUCCH resources of a first uplink slot or sub-slot n, according to the first set.

18 Claims, 4 Drawing Sheets

(51) Int. Cl.
  *H04L 1/1822* (2023.01)
  *H04L 5/00* (2006.01)

(56) References Cited

U.S. PATENT DOCUMENTS

| | | | |
|---|---|---|---|
| 2020/0106566 A1* | 4/2020 | Yeo | H04W 28/04 |
| 2021/0050948 A1 | 2/2021 | Geo et al. | |
| 2021/0203451 A1* | 7/2021 | Lei | H04L 1/1854 |
| 2021/0226759 A1* | 7/2021 | Takeda | H04L 5/0055 |
| 2021/0234643 A1* | 7/2021 | Wang | H04L 1/1887 |
| 2022/0103310 A1* | 3/2022 | Takeda | H04L 1/1896 |

OTHER PUBLICATIONS

NTT Docomo, Inc., UCI enhancements for URLLC, 3GPP TSG RAN WG1 #96, R1-1902805, Feb. 25-Mar. 1, 2019, Athens, Greece.

Intel Corporation, On enhancements to UCI for eURLLC, 3GPP TSG RAN WG1 #97, R1-1906807, May 13-17, 2019, Reno, USA.

Spreadtrum Communications, Discussion on DL SPS enhancements for URLLC, 3GPP TSG RAN WG1 Meeting #98, R1-1908945, Aug. 26-30, 2019, Prague, CZ.

Wilus Inc., On SPS PDSCH for NR URLLC, 3GPP TSG RAN WG1 #98bis, R1-1911320, Oct. 14-20, 2019, Chongqing, China.

Qualcomm Incorporated, Multi-TRP Enhancements, 3GPP TSG-RAN WG 1 Meeting #98, RI-1909272, Aug. 26-30, 2019, Prague, Czech Republic.

\* cited by examiner

HYBRID AUTOMATIC REPEAT REQUEST ACKNOWLEDGEMENT CODEBOOK DETERMINATION METHOD AND DEVICE

CROSS-REFERENCE TO RELATED APPLICATION

This application is a U.S. national phase application of a PCT Application No. PCT/CN2020/122098 filed on Oct. 20, 2020, which claims a priority to Chinese Patent Application No. 201911089029.0 filed on Nov. 8, 2019, the disclosures of which are incorporated in their entirety by reference herein.

TECHNICAL FIELD

The present disclosure relates to the field of mobile communications technology, and in particular, relates to a method of determining a Hybrid Automatic Repeat reQuest-Acknowledgement (HARQ-ACK) codebook and a device of determining a HARQ-ACK codebook.

BACKGROUND

In order to save a network downlink control signaling overhead, a New Radio (NR) system also supports Semi-persistent scheduling (SPS) besides a dynamic scheduling, the NR system allows a base station to perform a SPS configuration for a user through a high-layer signaling, and to activate the SPS configuration through downlink control information of a physical layer, so as to achieve a purpose of periodically allocating radio resources to a specific user. The semi-persistent scheduling has a characteristic of "scheduling once, used for multiple times." The SRS configuration in the NR system is realized through a Radio Resource Control (RRC) signaling.

A minimum period supported by a downlink (DL) SPS of the NR system in the related art is 10 ms. In order to support a low traffic latency, the DL SPS is enhanced in enhanced Ultra Reliable and Low Latency Communications (eU-RLLC), and the period of SPS is shortened to 1 slot.

In addition, after receiving a SPS Physical Downlink Shared Channel (PDSCH), the terminal needs to feedback a HARQ-Acknowledgement (HARQ-ACK) to a network according to whether the SPS PDSCH is correctly demodulated, wherein time-domain and frequency-domain resources of the HARQ-Acknowledgement (HARQ-ACK) are determined as follows.

Frequency-domain resources: the RRC signaling configures PUCCH-ResourceId through a parameter n1PUCCH-AN, which is used for determining frequency-domain resources of a Physical Uplink Control Channel (PUCCH); time-domain resources: for a PDSCH-to-PUCCH timing, first a set of HARQ timing values is configured through a parameter dl-DataToUL-ACK in the RRC signaling, and then a PDSCH-to-HARQ timing indicator is activated in the downlink control information (activation DCI), to indicate selection of one of the set of HARQ timing values configured by the RRC signaling.

The NR system supports a semi-static frame structure configuration, which can be configured by following Information Elements (IEs) configured by a high-layer signaling (e.g. the RRC signaling): TDD-UL-DL-ConfigCommon and/or TDD-UL-DL-ConfigDedicated. The NR system also supports dynamic slot format indication (Slot Format Indicator, SFI). That is, some slots/some symbols may be configured or indicated as uplink, downlink or flexible slots/symbols through the RRC signaling or Downlink Control Information (DCI). When some slots/some symbols are configured as downlink slots/symbols or indicated as flexible slots/symbols, HARQ-ACK of SPS PDSCH cannot be transmitted.

SUMMARY

At least one embodiment of the present disclosure provides a method and a device of determining a Hybrid Automatic Repeat request-Acknowledgement (HARQ-ACK) codebook, which can solve the problem the number of bits of a HARQ-ACK codebook is insufficient, thereby avoiding or reducing unnecessary SPS PDSCH retransmission and improving a spectral efficiency.

According to a first aspect of the present disclosure, at least one embodiment provides a method of determining a Hybrid Automatic Repeat reQuest-Acknowledgement (HARQ-ACK) codebook performed by a terminal. The method includes: determining a first set of candidate Physical Downlink Shared Channel (PDSCH) reception opportunities according to first information; determining HARQ-ACK information or a HARQ-ACK codebook transmitted on Physical Uplink Control Channel (PUCCH) resources of a first uplink slot or sub-slot n, according to the first set; wherein the first information includes at least one of following information: a set of slot timing values or sub-slot timing values $K_{1,1}, K_{1,2}, \ldots, K_{1,N}$ used to represent a timing from a PDSCH to a HARQ-ACK; first configuration information, wherein the first configuration information includes uplink-downlink configuration information at a cell level or at a user level.

Optionally, determining the first set of candidate PDSCH reception opportunities according to the first information includes: determining a second timing value set $\{K_{1,i}, K_{1,i}+1, \ldots, K_{1,i}+T-1\}$ for each timing value $K_{1,i}$ in the set of slot timing values or sub-slot timing values, and obtaining a plurality of second timing value sets, wherein T is a first period; determining a first timing value set including all timing values in the plurality of second timing value sets; and determining the first set of candidate PDSCH reception opportunities based on the first timing value set.

Optionally, determining the first set of candidate PDSCH reception opportunities according to the first information includes: determining the first set of candidate PDSCH reception opportunities according to a first timing value set, wherein timing values in the first timing value set belong to at least one of following: $\{K_{1,i}, K_{1,i}+1, \ldots, K_{1,i}+T-1\}$, i=1 ... N, N is a total quantity of timing values included in the set of slot timing values or sub-slot timing values, and T is a first period.

Optionally, determining the first set of candidate PDSCH reception opportunities according to the first information includes: determining the first set of candidate PDSCH reception opportunities according to a first timing value set, wherein the first timing value set includes all positive integers from $\min\{K_{1,i}\}$ to $\max\{K_{1,i}+T-1\}$, T is a first period.

Optionally, determining the first set of candidate PDSCH reception opportunities according to the first timing value set includes: traversing each timing value $K_{1,x}$ in the first timing value set; determining at least one first downlink slot corresponding to a first uplink slot or sub-slot n according to the timing value $K_{1,x}$; judging whether a certain time-domain resource allocation exists in the at least one first downlink slot according to the uplink-downlink configuration information, wherein each symbol in the certain time-domain resource allocation is not configured as uplink by the uplink-downlink configuration information; if the certain time-domain resource allocation exists, then adding at least one candidate PDSCH reception opportunity into the first set, wherein, the certain time-domain resource allocation is configured by a base station through a high-layer signaling, or is pre-agreed.

Optionally, determining the HARQ-ACK information or the HARQ-ACK codebook transmitted on PUCCH resources of the first uplink slot or sub-slot n according to the first set includes: for each PDSCH reception opportunity in the first set, reserving at least one bit in the HARQ-ACK information, for feeding back HARQ-ACK corresponding to the PDSCH reception opportunity.

Optionally, the first period T is predetermined; or, the first period T is configured by a base station through a high-layer signaling; or, the first period T is determined according to the first configuration information.

Optionally, the first period T is an integer, and first periods corresponding to different subcarrier spacings are same or different.

Optionally, the set of slot timing values or sub-slot timing values is predefined, or is configured by a base station through a high-layer signaling.

Optionally, the first configuration information includes following Information Elements (IE) configured by a base station through a high-layer signaling: Time-Division-Duplex (TDD)-Uplink (UL)-Downlink (DL)-Configuration-Common, and/or, TDD-UL-DL-ConfigDedicated.

Optionally, the method includes: for a target uplink slot or a target uplink sub-slot, determining whether the target uplink slot or the target uplink sub-slot is the first uplink slot or sub-slot n for transmitting the HARQ-ACK information, in any one of the following ways: determining that the target uplink slot or the target uplink sub-slot is not the first uplink slot or sub-slot n, if the target uplink slot or the target uplink sub-slot does not include any of target PUCCH resources; determining that the target uplink slot is not the first uplink slot or sub-slot n, if the target uplink slot or the target uplink sub-slot does not include any of target PUCCH resources, and no Semi-Persistent Scheduling (SPS) PDSCH reception satisfies a first condition; determining that the target uplink slot or the target uplink sub-slot is the first uplink slot or sub-slot n, and transmitting a HARQ-ACK codebook using PUCCH resources configured by a base station for a Semi-Persistent Scheduling (SPS) PDSCH through a high-layer signaling, if the target uplink slot or the target uplink sub-slot does not include any of target PUCCH resources and SPS PDSCH reception satisfying a first condition exists; determining that the target uplink slot is not the first uplink slot or sub-slot n, if the target uplink slot or the target uplink sub-slot includes any of target PUCCH resources and SPS PDSCH reception satisfying a first condition does not exist; wherein the target PUCCH resources are PUCCH resources indicated by a PDSCH-to-HARQ-feedback timing indicator and a PUCCH resource indicator included in Downlink Control Information; the first condition is that at least one symbol in a HARQ-ACK resource corresponding to the SPS PDSCH is configured or indicated to be downlink or flexible, and most adjacent uplink slot or sub-slot after the HARQ-ACK resource is the target uplink slot or target uplink sub-slot.

The embodiments of the present disclosure further provide a method of determining a Hybrid Automatic Repeat reQuest-Acknowledgement (HARQ-ACK) codebook performed by a base station. The method includes: determining a first set of candidate Physical Downlink Shared Channel (PDSCH) reception opportunities according to first information; determining HARQ-ACK information or a HARQ-ACK codebook received on Physical Uplink Control Channel (PUCCH) resources of a first uplink slot or sub-slot n, according to the first set; wherein the first information includes at least one of following information: a set of slot timing values or sub-slot timing values $K_{1,\ 1}$, $K_{1,\ 2}$, . . . , $K_{1,\ N}$ used to represent a timing from a PDSCH to a HARQ-ACK; first configuration information, wherein the first configuration information includes uplink-downlink configuration information at a cell level or at a user level.

Optionally, the method includes: for a target uplink slot or a target uplink sub-slot, determining whether the target uplink slot or the target uplink sub-slot is the first uplink slot or sub-slot n for receiving the HARQ-ACK information, in any one of the following ways: determining that the target uplink slot or the target uplink sub-slot is not the first uplink slot or sub-slot n, if the target uplink slot or the target uplink sub-slot does not include any of target PUCCH resources; determining that the target uplink slot is not the first uplink slot or sub-slot n, if the target uplink slot or the target uplink sub-slot does not include any of target PUCCH resources, and no Semi-Persistent Scheduling (SPS) PDSCH reception satisfies a first condition; determining that the target uplink slot or the target uplink sub-slot is the first uplink slot or sub-slot n, and transmitting a HARQ-ACK codebook using PUCCH resources configured by a base station for a Semi-Persistent Scheduling (SPS) PDSCH through a high-layer signaling, if the target uplink slot or the target uplink sub-slot does not include any of target PUCCH resources and a SPS PDSCH reception satisfying a first condition exists; determining that the target uplink slot is not the first uplink slot or sub-slot n, if the target uplink slot or the target uplink sub-slot includes any of target PUCCH resources and SPS PDSCH reception satisfying a first condition does not exist; wherein the target PUCCH resources are PUCCH resources indicated by a PDSCH-to-HARQ-feedback timing indicator and a PUCCH resource indicator included in Downlink Control Information; the first condition is that at least one symbol in a HARQ-ACK resource corresponding to the SPS PDSCH is configured or indicated to be downlink or flexible, and most adjacent uplink slot or sub-slot after the HARQ-ACK resource is the target uplink slot or target uplink sub-slot.

The embodiments of the present disclosure further provide a method of determining a Hybrid Automatic Repeat reQuest-Acknowledgement (HARQ-ACK) codebook performed by a terminal. The method includes: determining N bits of first HARQ-ACK information, wherein the first HARQ-ACK information at least includes HARQ-ACK information for feeding back a Physical Downlink Shared Channel (PDSCH) and/or Semi-Persistent Scheduling Physical Downlink Shared Channel release (SPS PDSCH release) scheduled by Downlink Control Information (DCI); adding M bits, after the first HARQ-ACK information, for transmitting the HARQ-ACK information of the target SPS PDSCHs, to obtain the HARQ-ACK information transmitted on Physical Uplink Control Channel (PUCCH) resources of a first uplink slot or sub-slot n, if activated M target SPS PDSCHs are received in a first set; wherein the first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$; wherein $K_{1,c}$ is a PDSCH-to-HARQ-feedback timing value corresponding to SPS PDSCH, and T is a first period.

Optionally, the target SPS PDSCHs belong to a same activated SPS configuration.

Optionally, determining the N bits of the first HARQ-ACK information includes: determining a PDCCH detection opportunity set according to a set of slot timing values or sub-slot timing values and according to slot offset values; detecting Downlink Control Information (DCI) according to the PDCCH detection opportunity set; constructing the N bits of HARQ-ACK information according to a counter Data Assignment Indication (counter DAI) and a total Data Assignment Indication (total DAI) in the detected DCI, wherein, the set of slot timing values or sub-slot timing values is used to represent a timing from a PDSCH to a HARQ-ACK, and the slot offset values are indicated by a time-domain resource allocation field included in the Downlink Control Information and are used to indicate the timing from a PDCCH to a PDSCH.

Optionally, the first period T is predetermined, or the first period T is configured by a base station to a terminal through a high-layer signaling, or the first period T is determined according to first configuration information, the first configuration information includes uplink-downlink configuration information at a cell level or at a user level.

Optionally, the first configuration information includes following Information Elements (IE) configured by a base station through a high-layer signaling: Time-Division-Duplex (TDD)-Uplink (UL)-Downlink (DL)-Configuration-Common, and/or, TDD-UL-DL-ConfigDedicated.

Optionally, the method further includes: for a target uplink slot or a target uplink sub-slot, determining whether the target uplink slot or the target uplink sub-slot is the first uplink slot or sub-slot n for transmitting the HARQ-ACK information, in any one of the following ways: determining that the target uplink slot or the target uplink sub-slot is not the first uplink slot or sub-slot n, if the target uplink slot or the target uplink sub-slot does not include any of target PUCCH resources; determining that the target uplink slot is not the first uplink slot or sub-slot n, if the target uplink slot or the target uplink sub-slot does not include any of target PUCCH resources, and no Semi-Persistent Scheduling (SPS) PDSCH reception satisfies a first condition; determining that the target uplink slot or the target uplink sub-slot is the first uplink slot or sub-slot n, and transmitting a HARQ-ACK codebook using PUCCH resources configured by a base station for a Semi-Persistent Scheduling (SPS) PDSCH through a high-layer signaling, if the target uplink slot or the target uplink sub-slot does not include any of target PUCCH resources and SPS PDSCH reception satisfying a first condition exists; determining that the target uplink slot is not the first uplink slot or sub-slot n, if the target uplink slot or the target uplink sub-slot includes any of target PUCCH resources and SPS PDSCH reception satisfying a first condition does not exist; wherein the target PUCCH resources are PUCCH resources indicated by a PDSCH-to-HARQ-feedback timing indicator and a PUCCH resource indicator included in Downlink Control Information; the first condition is that at least one symbol in a HARQ-ACK resource corresponding to the SPS PDSCH is configured or indicated to be downlink or flexible, and most adjacent uplink slot or sub-slot after the HARQ-ACK resource is the target uplink slot or target uplink sub-slot.

The embodiments of the present disclosure further provide a method of determining a Hybrid Automatic Repeat reQuest-Acknowledgement (HARQ-ACK) codebook performed by a base station. The method includes: determining N bits of first HARQ-ACK information, wherein the first N bits of HARQ-ACK information at least includes HARQ-ACK information for feeding back a Physical Downlink Shared Channel (PDSCH) and/or Semi-Persistent Scheduling Physical Downlink Shared Channel release (SPS PDSCH release) scheduled by Downlink Control Information (DCI); adding M bits, after the first HARQ-ACK information, for transmitting the HARQ-ACK information of the target SPS PDSCHs, to obtain the HARQ-ACK information received on Physical Uplink Control Channel (PUCCH) resources of a first uplink slot or sub-slot n, if activated M target SPS PDSCHs are received in a first set; wherein the first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$; wherein $K_{1,c}$ is a PDSCH-to-HARQ-feedback timing value corresponding to SPS PDSCH, and T is a first period.

Optionally, the method includes: for a target uplink slot or a target uplink sub-slot, determining whether the target uplink slot or the target uplink sub-slot is the first uplink slot or sub-slot n for receiving the HARQ-ACK information, in any one of the following ways: determining that the target uplink slot or the target uplink sub-slot is not the first uplink slot or sub-slot n, if the target uplink slot or the target uplink sub-slot does not include any of target PUCCH resources; determining that the target uplink slot is not the first uplink slot or sub-slot n, if the target uplink slot or the target uplink sub-slot does not include any of target PUCCH resources, and no Semi-Persistent Scheduling (SPS) PDSCH reception satisfies a first condition; determining that the target uplink slot or the target uplink sub-slot is the first uplink slot or sub-slot n, and transmitting a HARQ-ACK codebook using PUCCH resources configured by a base station for a Semi-Persistent Scheduling (SPS) PDSCH through a high-layer signaling, if the target uplink slot or the target uplink sub-slot does not include any of target PUCCH resources and SPS PDSCH reception satisfying a first condition exists; determining that the target uplink slot is not the first uplink slot or sub-slot n, if the target uplink slot or the target uplink sub-slot includes any of target PUCCH resources and SPS PDSCH reception satisfying a first condition does not exist; wherein the target PUCCH resources are PUCCH resources indicated by a PDSCH-to-HARQ-feedback timing indicator and a PUCCH resource indicator included in Downlink Control Information; the first condition is that at least one symbol in a HARQ-ACK resource corresponding to the SPS PDSCH is configured or indicated to be downlink or flexible, and most adjacent uplink slot or sub-slot after the HARQ-ACK resource is the target uplink slot or target uplink sub-slot.

The embodiments of the present disclosure further provide a communication device, the communication device being a terminal or a base station includes: a first determining module, configured to determine a first set of candidate Physical Downlink Shared Channel (PDSCH) reception opportunities according to first information; a second determining module, configured to determine Hybrid Automatic Repeat reQuest-Acknowledgement (HARQ-ACK) information or a HARQ-ACK codebook transmitted or received on Physical Uplink Control Channel (PUCCH) resources of a first uplink slot or sub-slot n, according to the first set; wherein the first information includes at least one of following information: a set of slot timing values or sub-slot timing values $K_{1,1}, K_{1,2}, \ldots, K_{1,N}$ used to represent a timing from a PDSCH to a HARQ-ACK; first configuration information, wherein the first configuration information includes uplink-downlink configuration information at a cell level or at a user level.

Optionally, the first determining module is further configured to: determine a second timing value set $\{K_{1,i}, K_{1,i}+1, \ldots, K_{1,i}+T-1\}$ for each timing value $K_{1,i}$ in the set of slot timing values or sub-slot timing values, and obtain a plurality of second timing value sets, wherein T is a first period; determine a first timing value set including all timing values in the plurality of second timing value sets; and determine the first set of candidate PDSCH reception opportunities based on the first timing value set.

Optionally, the first determining module is further configured to: determine the first set of candidate PDSCH reception opportunities according to a first timing value set, wherein timing values in the first timing value set belong to at least one of following: $\{K_{1,i}, K_{1,i}+1, \ldots, K_{1,i}+T-1\}$, $i=1 \ldots N$, N is a total quantity of timing values included in the set of slot timing values or sub-slot timing values, and T is a first period.

Optionally, the first determining module is further configured to: determine the first set of candidate PDSCH reception opportunities according to a first timing value set, wherein the first timing value set includes all positive integers from $\min\{K_{1,i}\}$ to $\max\{K_{1,i}+T-1\}$, T is a first period.

Optionally, the first determining module is further configured to, when determining the first set of candidate PDSCH reception opportunities according to the first timing value set, traverse each timing value $K_{1,X}$ in the first timing value set, determine at least one first downlink slot corresponding to a first uplink slot or sub-slot n according to the timing value $K_{1,X}$, judge whether a certain time-domain resource allocation exists in the at least one first downlink slot according to the uplink-downlink configuration information, wherein each symbol in the certain time-domain resource allocation is not configured as uplink by the uplink-downlink configuration information, add at least one candidate PDSCH reception opportunity into the first set, if the certain time-domain resource allocation exists, wherein, the certain time-domain resource allocation is configured by a base station through a high-layer signaling, or is pre-agreed.

Optionally, the communication device further includes: a third determining module, configured to, for a target uplink slot or a target uplink sub-slot, determine whether the target uplink slot or the target uplink sub-slot is the first uplink slot or sub-slot n for transmitting the HARQ-ACK information, in any one of the following ways: determining that the target uplink slot or the target uplink sub-slot is not the first uplink slot or sub-slot n, if the target uplink slot or the target uplink sub-slot does not include any of target PUCCH resources; determining that the target uplink slot is not the first uplink slot or sub-slot n, if the target uplink slot or the target uplink sub-slot does not include any of target PUCCH resources, and no Semi-Persistent Scheduling (SPS) PDSCH reception satisfies a first condition; determining that the target uplink slot or the target uplink sub-slot is the first uplink slot or sub-slot n, and transmitting a HARQ-ACK codebook using PUCCH resources configured by a base station for a Semi-Persistent Scheduling (SPS) PDSCH through a high-layer signaling, if the target uplink slot or the target uplink sub-slot does not include any of target PUCCH resources and a SPS PDSCH reception satisfying a first condition exists; determining that the target uplink slot is not the first uplink slot or sub-slot n, if the target uplink slot or the target uplink sub-slot includes any of target PUCCH resources and SPS PDSCH reception satisfying a first condition does not exist; wherein the target PUCCH resources are PUCCH resources indicated by a PDSCH-to-HARQ-feedback timing indicator and a PUCCH resource indicator included in Downlink Control Information; the first condition is that at least one symbol in a HARQ-ACK resource corresponding to the SPS PDSCH is configured or indicated to be downlink or flexible, and most adjacent uplink slot or sub-slot after the HARQ-ACK resource is the target uplink slot or target uplink sub-slot.

The embodiments of the present disclosure further provide a communication device, the communication device being a terminal or a base station includes: a transceiver and a processor, wherein, the processor is configured to: determine a first set of candidate Physical Downlink Shared Channel (PDSCH) reception opportunities according to first information; determine HARQ-ACK information or a HARQ-ACK codebook transmitted or received on Physical Uplink Control Channel (PUCCH) resources of a first uplink slot or sub-slot n, according to the first set; wherein the first information includes at least one of following information: a set of slot timing values or sub-slot timing values $K_{1,1}, K_{1,2}, \ldots, K_{1,N}$ used to represent a timing from a PDSCH to a HARQ-ACK; first configuration information, wherein the first configuration information includes uplink-downlink configuration information at a cell level or at a user level.

The embodiments of the present disclosure further provide a communication device, the communication device being a terminal or a base station includes: a first determining module, configured to determine N bits of first Hybrid Automatic Repeat reQuest-Acknowledgement (HARQ-ACK) information, wherein the first HARQ-ACK information at least includes HARQ-ACK information for feeding back a Physical Downlink Shared Channel (PDSCH) and/or Semi-Persistent Scheduling Physical Downlink Shared Channel release (SPS PDSCH release) scheduled by Downlink Control Information (DCI); an adding module, configured to add M bits, after the first HARQ-ACK information, for transmitting the HARQ-ACK information of the target SPS PDSCHs, to obtain the HARQ-ACK information transmitted or received on Physical Uplink Control Channel (PUCCH) resources of a first uplink slot or sub-slot n, if activated M target SPS PDSCHs are received in a first set; wherein the first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$; wherein $K_{1,c}$ is a PDSCH-to-HARQ-feedback timing value corresponding to SPS PDSCH, and T is a first period.

Optionally, the communication device further includes: a second determining module, configured to, for a target uplink slot or a target uplink sub-slot, determine whether the target uplink slot or the target uplink sub-slot is the first uplink slot or sub-slot n for transmitting the HARQ-ACK information, in any one of the following ways: determining that the target uplink slot or the target uplink sub-slot is not the first uplink slot or sub-slot n, if the target uplink slot or the target uplink sub-slot does not include any of target PUCCH resources; determining that the target uplink slot is not the first uplink slot or sub-slot n, if the target uplink slot or the target uplink sub-slot does not include any of target PUCCH resources, and no Semi-Persistent Scheduling (SPS) PDSCH reception satisfies a first condition; determining that the target uplink slot or the target uplink sub-slot is the first uplink slot or sub-slot n, and transmitting a HARQ-ACK codebook using PUCCH resources configured by a base station for a Semi-Persistent Scheduling (SPS) PDSCH through a high-layer signaling, if the target uplink slot or the target uplink sub-slot does not include any of target PUCCH resources and a SPS PDSCH reception satisfying a first condition exists; determining that the target uplink slot is not the first uplink slot or sub-slot n, if the target uplink slot or the target uplink sub-slot includes any of target PUCCH resources and SPS PDSCH reception satisfying a first condition does not exist; wherein the target PUCCH resources are PUCCH resources indicated by a PDSCH-to-HARQ-feedback timing indicator and a PUCCH resource indicator included in Downlink Control Information; the first condition is that at least one symbol in a HARQ-ACK resource corresponding to the SPS PDSCH is configured or indicated to be downlink or flexible, and most adjacent uplink slot or sub-slot after the HARQ-ACK resource is the target uplink slot or target uplink sub-slot.

The embodiments of the present disclosure further provide a communication device. The communication device being a terminal or a base station includes: a transceiver and a processor, wherein, the processor is configured to: determine N bits of first Hybrid Automatic Repeat reQuest-Acknowledgement (HARQ-ACK) information, wherein the first HARQ-ACK information at least includes HARQ-ACK information for feeding back a Physical Downlink Shared Channel (PDSCH) and/or Semi-Persistent Scheduling Physical Downlink Shared Channel release (SPS PDSCH release) scheduled by Downlink Control Information (DCI); and add M bits, after the HARQ-ACK information of N bits, for transmitting the HARQ-ACK information of the target SPS PDSCHs, to obtain the HARQ-ACK information transmitted or received on Physical Uplink Control Channel (PUCCH) resources of a first uplink slot or sub-slot n, if activated M target SPS PDSCHs are received in a first set; wherein the first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$; wherein $K_{1,c}$ is a PDSCH-to-HARQ-feedback timing value corresponding to SPS PDSCH, and T is a first period.

The embodiments of the present disclosure further provide a communication device. The communication device being a terminal or a base station includes: a processor, a storage and a program stored on the storage and executable by the processor, wherein, when the program is executed by the processor, the processor implements steps of the method described above.

The embodiments of the present disclosure further provide a computer readable storage medium. A program is stored on the computer readable storage medium, wherein when the program is executed by a processor, the processor implements steps of the method provided above.

Compared with the related art, the method and the device of determining the Hybrid Automatic Repeat request Acknowledgement (HARQ-ACK) codebook provided in the embodiments of the present disclosure, when determining the semi-static codebook and the dynamic codebook, expands the K1 set and the set of candidate PDSCH reception opportunities and the redundant feedback, the problem that postponing SPS PDSCH HARQ-ACK causes insufficient number of HARQ-ACK codebook bits, thereby avoiding unnecessary retransmission of SPS PDSCH and improving a spectral efficiency.

BRIEF DESCRIPTION OF THE DRAWINGS

Various other advantages and benefits will become apparent to those of ordinary skills in the art upon reading the following detailed description of optional embodiments. Drawings are for the purpose of illustrating optional embodiments only and are not to be construed as limiting to the present disclosure. Additionally, the same reference numerals are used to denote the same parts throughout the drawings. In the drawings.

DETAILED DESCRIPTION

Figure 1:
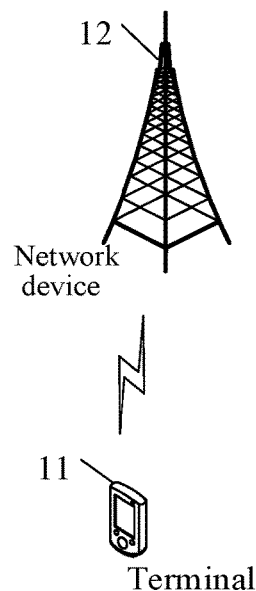
FIG. 1 is a schematic diagram of an application scenario according to an embodiment of the present disclosure.

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments set forth herein. Rather, these embodiments are provided to enable a more thorough understanding of the present disclosure and to convey fully the scope of the present disclosure to those skilled in the art.

Such terms as "first," "second," etc. in the specification and claims of the present application are used to distinguish similar objects and need not be used to describe a particular order or sequence. It should be understood that terms used in this way may be interchanged where appropriate so that the embodiments of the present application described herein can be implemented, for example, in an order other than those illustrated or described herein. In addition, such terms as "including" and "having" and any variations thereof are intended to cover non-exclusive inclusions such as, for example, a process, a method, a system, a product or a device including a series of steps or units need not be limited to those clearly listed, but may include other steps or units not explicitly listed or inherent to these processes, methods, products or devices. In the description and claims, "and/or" means at least one of the connected objects.

The techniques described herein are not limited to the NR systems and the Long Term Evolution (LTE)/LTE-Advanced (LTE-A) systems, and may also be used for various radio communication systems, such as Code Division Multiple Access (CDMA), Time Division Multiple Access (TDMA), Frequency Division Multiple Access (TDMA), Orthogonal Frequency Division Multiple Access (OFDMA), Single-Carrier Frequency Division Multiple Access (SC-FDMA), and other systems. Such terms as 'system' and 'network' are often used interchangeably. CDMA systems may implement radio technologies such as CDMA2000, Universal Terrestrial Radio Access (UTRA), and the like. UTRA includes Wideband Code Division Multiple Access (WCDMA) and other CDMA variants. A TDMA system may implement a radio technology such as the Global System for Mobile Communications (GSM). An OFDMA system may implement radio technologies such as UltraMobile Broadband (UMB), Evolution-UTRA (E-UTRA), IEEE 802.21 (Wi-Fi), IEEE 802.16 (WiMAX), IEEE 802.20, Flash-OFDM, etc. UTRA and E-UTRA are part of a Universal Mobile Telecommunications System (UMTS), LTE and more advanced LTE (e.g. LTE-A) are new UMTS versions using E-UTRA. UTRA, E-UTRA, UMTS, LTE, LTE-A, and GSM are described in documents from an organization called the Third Generation Partnership Project (3GPP). CDMA2000 and UMB are described in a document from an organization called Third Generation Partnership Project 2 (3GPP2). The techniques described herein may be used for both the systems and radio technologies mentioned above and for other systems and radio technologies. However, the following description describes the NR system for illustrative purposes and uses terminology of the NR in most of the following description, although these techniques may also be applied to applications other than the NR system.

The following description provides examples and does not limit the scope, applicability, or configuration set forth in the claims. Changes may be made to the function and arrangement of the elements discussed without departing from the spirit and the scope of the present disclosure. In various examples, various procedures or components may be omitted, replaced, or added as appropriate. For example, the described methods may be performed in a different order than that described, and various steps may be added, omitted, or combined. In addition, features described with reference to certain examples may be combined in other examples.

Please refer to FIG. 1, which illustrates a block diagram of a radio communication system to which an embodiment of the present disclosure is applicable. The radio communication system includes a terminal 11 and a network device 12. The terminal 11 may also be referred to as a terminal-side device, such as a user terminal or a User Equipment (UE), the terminal 11 may be a mobile phone, a Tablet Personal Computer, a Laptop Computer, a Personal Digital Assistant (PDA), a Mobile Internet Device (MID), a Wearable Device, or a vehicle-mounted device. It should be noted that the embodiment of the present disclosure is not limited to a specific type of the terminal 11. The network device 12 may be a base station and/or a network element of a core network, wherein the base station may be a 5G and a later version of a base station ((e.g., gNB, 5G NR NB, etc.), or base stations in other communication systems (e.g., eNB, Wireless Local Area Network (WLAN), or other access points), where, a base station may be referred to as a Node B, an Evolved Node B, an access Point, a Base Transceiver Station (BTS), a Radio Base Station, a Radio Transceiver Station, a Basic Service Set (BSS), an Extended Service Set (ESS), a Node B, an Evolved Node B (eNB), a Home Node B, a Home Evolved Node B, a WLAN Access Point, a WiFi Node or some other suitable terminology in the art, as long as the same technical effect is achieved, the base station is not limited to a specific technical vocabulary, it should be noted that in the embodiment of the present disclosure, only the base station in the NR system is taken as an example, but the base station is not limited to a specific type.

The base station may communicate with the terminal 11 under the control of a base station controller, which may be part of a core network or some base stations in various examples. Some base stations may communicate control information or user data with the core network over a backhaul. In some examples, some of the base stations may communicate with each other directly or indirectly through a backhaul link which may be a wired or wireless communication link. A radio communication system may support operation on multiple carriers (waveform signals of different frequencies). A multi-carrier transmitter can transmit modulated signals on the multiple carriers simultaneously. For example, each communication link may be a multi-carrier signal modulated according to various radio technologies. Each modulated signal may be transmitted on a different carrier and may carry control information (e.g., a reference signal, a control channel, etc.), overhead information, data, etc.

The base station may wirelessly communicate with the terminal 11 via one or more access-point antennas. Each base station may provide communication coverage for a respective coverage area. The coverage area of an access point may be divided into sectors that constitute only a portion of the coverage area. A radio communication system may include different types of base stations (, e.g., macro, micro, or pico base stations). The base station may also utilize different radio technologies, such as cellular or WLAN radio access technologies. The base stations may be associated with the same or different access networks or operator deployments. The coverage areas of different base stations (including coverage areas of base stations of the same or different types, coverage areas using the same or different radio technologies, or coverage areas belonging to the same or different access networks) may overlap.

A communication link in a radio communication system may include an Uplink (UL) for carrying uplink transmissions (such as from a terminal 11 to a network device 12), or a Downlink (DL) for carrying downlink (DL) transmissions (such as from the network device 12 to the terminal 11). The UL transmissions may also be referred to as reverse link transmissions, while the DL transmissions may also be referred to as forward link transmissions. The downlink transmission may be made using a licensed frequency band, an unlicensed frequency band, or both. Similarly, the uplink transmissions may be made using a licensed frequency band, an unlicensed frequency band, or both.

As described in the background, unexpected situations such as cell access failure, slice access failure or slice Quality of Service (QoS) fallback in the related art may occur after cell reselection or access by a terminal, and seriously affect user experience. In order to solve at least one of the above problems, the embodiments of the present disclosure provide a method of determining a Hybrid Automatic Repeat reQuest (HARD) codebook, which can reduce or avoid occurrence of the above situation, improve a communication efficiency and improve the user experience.

As can be seen from the introduction of the related art in the background, a timing of the HARQ-ACK feedback of the SPS PDSCH is determined through a RRC signaling+ activation DCI, and once the activation DCI activates a certain HARQ timing value, this same HARQ timing value is used for all SPS PDSCHs.

Figure 2:
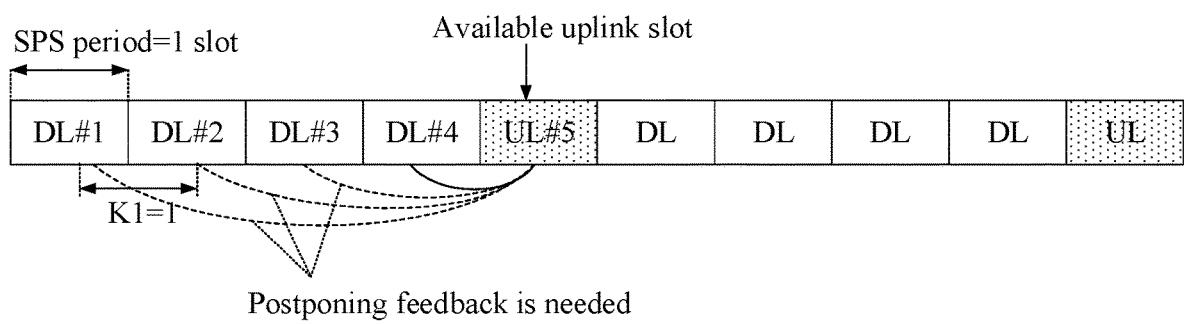
FIG. 2 is an exemplary diagram of HARQ feedback in the related art.

When a minimum period of the DL SPS PDSCH is 10 ms, configuration of a semi-static frame structure can be suitably adapted to, even if the HARQ timings of the SPS PDSCHs are the same, HARQ-ACK is indicated onto an available uplink (UL) slot. When a period of ae DL SPS PDSCH is further shortened to 1 slot, as shown in FIG. 2, it is assumed that the semi-static frame structure is configured as DDDDU (D denotes downlink, U denotes uplink). Slots DL #1 to DL #4 are all downlink slots, and UL #5 is an uplink slot. No matter what a HARQ timing (K1) is activated in the activation DCI is (K1=1 in FIG. 2), the HARQ-ACK feedback for PDSCHs on 3 slots (DL #1 to DL #3 in FIG. 2) cannot be implemented.

Figure 3:
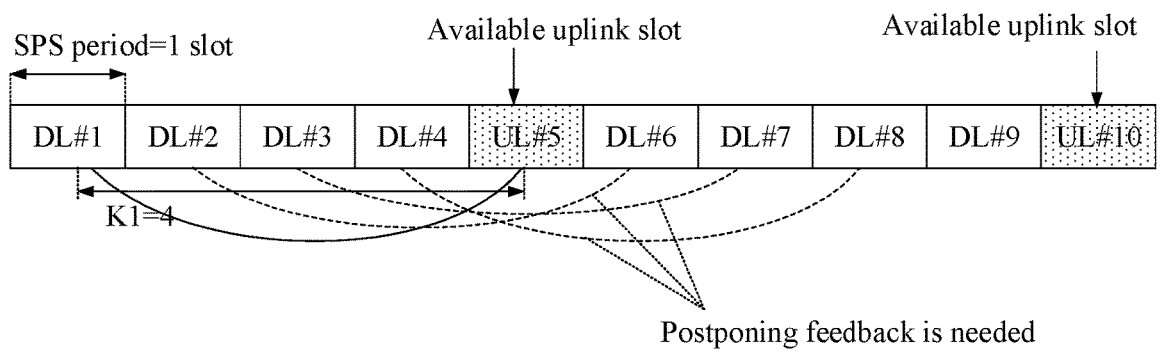
FIG. 3 is an exemplary diagram of HARQ feedback of an embodiment of the present disclosure.

It is assumed that the HARQ-ACK feedback that cannot be implemented can be postponed to the next available UL slot for feedback, but this problem is not considered in the related art when determining a HARQ-ACK codebook, that is, there is no sufficient bit reserved for HARQ-ACKs of these PDSCHs in the HARQ-ACK codebooks, which will be described below for cases of using a semi-static codebook and a dynamic codebook, respectively:

1. when determining a semi-static codebook, the related art determines the set of candidate PDSCH reception opportunities through a K1 set; if the K1 set={1, 2, 3, 4, 5} and K1 indicated in the activation DCI=4, then, as shown in FIG. 3, HARQ-ACKs of PDSCHs in downlink slots DL #2 to DL #4 will be postponed to be implemented on the second UL slot; when the HARQ-ACK codebook in the second UL slot is determined, no bit position is reserved for the HARQ-ACKs of the PDSCHs in the downlink slots DL #2 to DL #4, therefore, the HARQ-ACK codebook transmitted on the second UL slot has a problem that the number of reserved bits is insufficient;

2. when determining a dynamic codebook, a method of processing the HARQ-ACK of the SPS PDSCH in the related art is to reserve 1 bit in the last of the codebook, for transmitting the HARQ-ACK of the SPS PDSCH; however, after the period of a DL SPS PDSCH is shortened to 1 slot, as shown in FIG. 2, and if K1=1, then the PDSCHs in downlink slots DL #1 to DL #3 need to be postponed to UL #5 to feed back the HARQ-ACKs; therefore, the HARQ-ACK codebook transmitted in the UL slot #5 may have a problem of the insufficient number of reserved bits.

In order to solve at least one of the above problems, an embodiment of the present disclosure provides a method of determining a Hybrid Automatic Repeat reQuest (HARD) codebook. When determining a semi-static codebook and a dynamic codebook, by expanding the K1 set, the candidate PDSCH reception opportunity set and manners of redundant feedback, the problem of the insufficient number of bits for the HARQ-ACK codebook due to postponing SPS PDSCH HARQ-ACK is solved, and unnecessary retransmission of a SPS PDSCH is avoided, and a spectral efficiency is improved.

How to determine a HARQ-ACK codebook when employing a semi-static codebook is first described below in some embodiments of the present disclosure.

Figure 4:
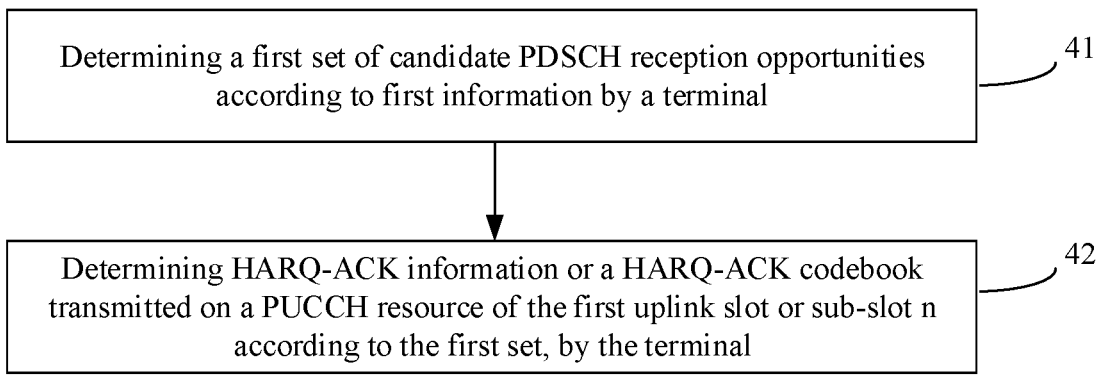
FIG. 4 is a flowchart of a method of determining a semi-static HARQ-ACK codebook according to an embodiment of the present disclosure.

The method of determining a semi-static HARQ-ACK codebook provided in an embodiment of the present disclosure may be applied to a terminal or a base station, and used for determining a HARQ-ACK codebook of a Semi-Persistent Scheduling Physical Downlink Shared Channel (SPS PDSCH). Hereinafter, a terminal is taken as an example for explanation. Referring to FIG. 4, when applied to a terminal side, the method of determining a semi-static HARQ-ACK codebook according to an embodiment of the present disclosure includes steps 41-42.

Step 41: determining a first set of candidate PDSCH reception opportunities according to first information by the terminal.

Here, the first information may include at least one of the following information: A) a set of slot timing values or sub-slot timing values $K_{1,1}, K_{1,2}, \ldots K_{1,N}$ used to represent the timing from PDSCH to HARQ-ACK, here, the set of slot timing values or sub-slot timing values may be predefined, or may be configured to the terminal by the base station through a high-layer signaling; specifically, the set of slot timing values or sub-slot timing values may be a K1 set configured by the base station in the related art; B) first configuration information, wherein the first configuration information includes uplink-downlink configuration information at a cell level or at a user level; here, the first configuration information may specifically include the following Information Elements (IE) configured by the base station through a high-layer signaling (e.g. an RRC signaling): TDD-UL-DL-ConfigurationCommon and/or TDD-UL-DL-ConfigDedicated; the TDD-UL-DL-ConfigurationCommon may also be referred to as a time-division-duplex-uplink-downlink common configuration, and the TDD-UL-DL-ConfigDedicated may also be referred to as a time-division-duplex-uplink-downlink dedicated configuration. Of course, the base station in the embodiment of the present disclosure may also use other IE or newly defined configuration parameters in the related art as the first configuration information, and the embodiment of the present disclosure does not specifically limit this.

Step 42: determining HARQ-ACK information or a HARQ-ACK codebook transmitted on a PUCCH resource of the first uplink slot or sub-slot n according to the first set, by the terminal.

Here, for each PDSCH reception opportunity in the first set, at least one bit for feeding back HARQ-ACK corresponding to the PDSCH reception opportunity is reserved in the HARQ-ACK information, so as to obtain a HARQ-ACK codebook corresponding to the first set, that is, HARQ-ACK information transmitted on a PUCCH resource of the first uplink slot or sub-slot n.

Through the above steps, the embodiment of the present disclosure determines the first set of candidate PDSCH reception opportunities according to the first information, expands the set of candidate PDSCH reception opportunities, and thus, in the embodiment of the present disclosure, when determining the semi-static codebook of the first uplink slot or the sub-slot n, not only HARQ-ACK bits already contained in the related art are included, HARQ-ACK corresponding to a SPS PDSCH is postponed to the HARQ-ACK bit on the first uplink slot or sub-slot n, so that more redundancy bits can be introduced when determining the HARQ-ACK codebook. The problem that the number of bits of the HARQ-ACK codebook is insufficient due to SPS PDSCH HARQ-ACK being postponed is solved, thereby avoiding unnecessary retransmission of SPS PDSCH and improving a spectrum efficiency.

Specifically, in the above step 41, determining the first set of candidate PDSCH reception opportunities may have different implementations, which will be described in detail below.

First implementation: the terminal may determine a second timing value set $\{K_{1,i}, K_{1,i}+1, \ldots, K_{1,i}+T-1\}$ for each timing value $K_{1,i}$ in the set of slot timing values or sub-slot timing values, and obtain a plurality of second timing value sets, wherein T is a first period; then determine a first timing value set including all timing values in the plurality of second timing value sets; and then, determine a first set of candidate PDSCH reception opportunities based on the first timing value set.

Second implementation: the terminal may determine a first set of candidate PDSCH reception opportunities according to a first timing value set, wherein timing values in the first timing value set belong to at least one of the following: $\{K_{1,i}, K_{1,i}, +1, \ldots, K_{1,i}+T-1\}$, i=1 ... N, N is the total number of timing values included in the set of slot timing values or sub-slot timing values, and T is a first period.

Third implementation: a first set of candidate PDSCH reception opportunities is determined according to a first timing value set, wherein the first timing value set includes all positive integers from min{$K_{1,i}$} to max {$K_{1,i}$+T−1}, the T is the first period.

In each of the above implementations, the first period T may be pre-agreed, or the first period T may be configured by the base station to the terminal through a high-layer signaling, or, the first period T may be determined by the terminal according to the first configuration information. The first period T may be an integer, and the first periods corresponding to different subcarrier spacings may be the same or different. Optionally, the first period may be an uplink-downlink conversion period.

In each of the above implementations, determining the first set of candidate PDSCH reception opportunities according to the first timing value set may specifically include: traversing each timing value $K_{1,x}$ in the first timing value set, and determining at least one first downlink slot corresponding to a first uplink slot or a sub-slot n according to the timing value $K_{1,x}$, and judging whether a certain time-domain resource allocation exists in the first downlink slot according to the uplink-downlink configuration information, wherein each symbol in the certain time-domain resource allocation is not configured as uplink by the uplink-downlink configuration information, and if the certain time-domain resource allocation exists, then at least one candidate PDSCH reception opportunity is added in the first set, wherein, the certain time-domain resource allocation is configured by the base station through a high-layer signaling, or is pre-agreed.

Through above implementations, the embodiment of the present disclosure expands the K1 set in the related art to the first timing value set, and by adding the timing value, when subsequently determining the first set of candidate PDSCH reception opportunities based on the first timing value set, the candidate PDSCH reception opportunities are expanded, so that more codebook bits are added when determining the codebook based on the first set in step 42, thereby solving the problem in the related art that the number of bits of the HARQ-ACK codebook is insufficient due to the SPS PDSCH HARQ-ACK being postponed, avoiding unnecessary retransmission of the SPS PDSCH, and improving the spectrum efficiency.

Directed to a certain uplink slot or sub-slot (hereinafter referred to as a target uplink slot or target uplink sub-slot for convenience of description), the embodiments of the present disclosure may also determine whether the target uplink slot or the target uplink sub-slot is a first uplink slot or sub-slot n for transmitting HARQ-ACK information, in at least one of the following ways a) to d).

Way a): if the target uplink slot or the target uplink sub-slot does not include any of the target PUCCH resources, then determining that the target uplink slot or the target uplink sub-slot is not the first uplink slot or sub-slot n;

Way b): if the target uplink slot or the target uplink sub-slot does not include any of the target PUCCH resources, and SPS PDSCH reception satisfying the first condition does not exist, then determining that the target uplink slot is not the first uplink slot or sub-slot n;

Way c): if the target uplink slot or the target uplink sub-slot does not include any of the target PUCCH resources and SPS PDSCH reception satisfying the first condition exists, then determining that the target uplink slot or the target uplink sub-slot is the first uplink slot or sub-slot n, and transmitting a HARQ-ACK codebook using PUCCH resources configured by a base station for the SPS PDSCH through a high-layer signaling;

Way d): if the target uplink slot or the target uplink sub-slot includes any of the target PUCCH resources and SPS PDSCH reception satisfying the first condition does not exist, then determining that the target uplink slot is not the first uplink slot or sub-slot n.

The target PUCCH resources are PUCCH resources indicated by a PDSCH-to-HARQ-feedback timing indicator and a PUCCH resource indicator included in downlink control information; the first condition is that at least one symbol in HARQ-ACK resources corresponding to the SPS PDSCH is configured or indicated to be downlink or flexible, and most adjacent uplink slot or sub-slot after the HARQ-ACK resources is the target uplink slot or the target uplink sub-slot.

When it is determined that the target uplink slot or the target uplink sub-slot is a first uplink slot or sub-slot n for transmitting HARQ-ACK information, the embodiments of the present disclosure may determine the HARQ-ACK information (i.e., the determined HARQ-ACK codebook) transmitted in the target uplink slot or the target uplink sub-slot, in the manner of steps 41 to 42. However, when it is determined that the target uplink slot or the target uplink sub-slot is not the first uplink slot or sub-slot n for transmitting the HARQ-ACK information, the embodiments of the present disclosure may not update the set of slot timing values or sub-slot timing values, that is, the K1 set, but determine the first set of candidate PDSCH reception opportunities directly according to the K1 set, and then according to the determined first set, determine the HARQ-ACK information or the HARQ-ACK codebook transmitted on the target uplink slot or the target uplink sub-slot.

Still taking FIG. 3 as an example, assuming that the base station configures K1 set={1, 2, 3, 4} and the uplink-downlink conversion period T=5 through the high-layer signaling, then when the terminal determines the number of bits for the semi-static codebook, the terminal updates the K1 set to {1, 1+5−1}, {2, 2+5−1} . . . {4, 4+5−1}, and then determines the union of the above sets, so that the updated K1 set is {1, 2, 3, 4, 5, 6, 7, 8}. The terminal traverses each $K_{1,x}$ in the updated K1 set, determines a downlink slot corresponding to the uplink slot UL #5 according to the $K_{1,x}$ and the uplink-downlink subcarrier spacing, and then, in the downlink slot, determines each row of time-domain resource allocations in a time-domain resource allocation table, and if there is a row of time-domain resource allocations, each symbol of which is not configured as uplink by a semi-static frame structure configuration (e.g., TDD-UL-DL-ConfigurationCommon and/or TDD-UL-DL-ConfigDedicated) information, then at least 1 bit for feedbacking HARQ-ACK is reserved for the downlink slot.

Figure 5:
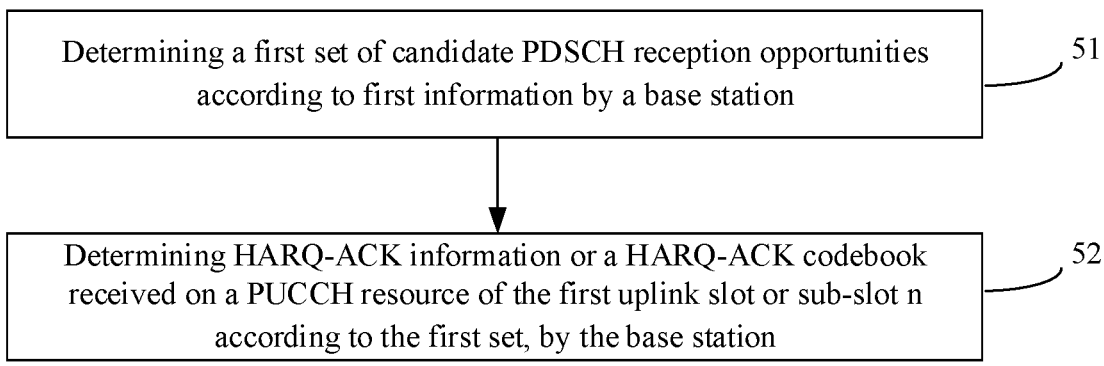
FIG. 5 is another flowchart of a method of determining a semi-static HARQ-ACK codebook according to an embodiment of the present disclosure.

Referring to FIG. 5, the method of determining a semi-static HARQ-ACK codebook provided in an embodiment of the present disclosure is applied to a base station side, and includes steps 51 and 52.

Step 51: determining a first set of candidate PDSCH reception opportunities according to the first information by the base station.

Here, the first information may include at least one of the following information: A) a set of slot timing values or sub-slot timing values $K_{1,1}$, $K_{1,2}$, . . . $K_{1,N}$ used to represent the timing from PDSCH to HARQ-ACK, here, the set of slot timing values or sub-slot timing values may be predefined, or may be configured to a terminal by the base station through a high-layer signaling; specifically, the set of slot timing values or sub-slot timing values may be a K1 set configured by the base station in the related art; B) first configuration information, wherein the first configuration information includes uplink-downlink configuration information at a cell level or at a user level; here, the first configuration information may specifically include the following Information Elements (IE) configured by the base station through a high-layer signaling (e.g. an RRC signaling): TDD-UL-DL-ConfigurationCommon and/or TDD-UL-DL-ConfigDedicated; the TDD-UL-DL-Configuration-Common may also be referred to as a time-division-duplex-uplink-downlink common configuration, and the TDD-UL-DL-ConfigDedicated may also be referred to as a time-division-duplex-uplink-downlink dedicated configuration. Of course, the base station in the embodiment of the present disclosure may also use other IE or newly defined configuration parameters in the related art as the first configuration information, and the embodiment of the present disclosure does not specifically limit this.

Step 52: determining HARQ-ACK information or a HARQ-ACK codebook received on a PUCCH resource of the first uplink slot or sub-slot n according to the first set, by the base station.

Here, for each PDSCH reception opportunity in the first set, at least one bit for feeding back HARQ-ACK corresponding to the PDSCH reception opportunity is reserved in the HARQ-ACK information, so as to obtain a HARQ-ACK codebook corresponding to the first set, that is, HARQ-ACK information received on a PUCCH resource of the first uplink slot or sub-slot n.

For more details of the method of determining the semi-static HARQ-ACK codebook in the embodiment of the present disclosure implemented at the base station side, reference may be made to the detailed description of that implemented at the terminal side, and is not repeated here for brevity.

The method of determining the semi-static codebook of the embodiment of the present disclosure is described above. A method of determining dynamic codebook determination method is further described below.

Figure 6:
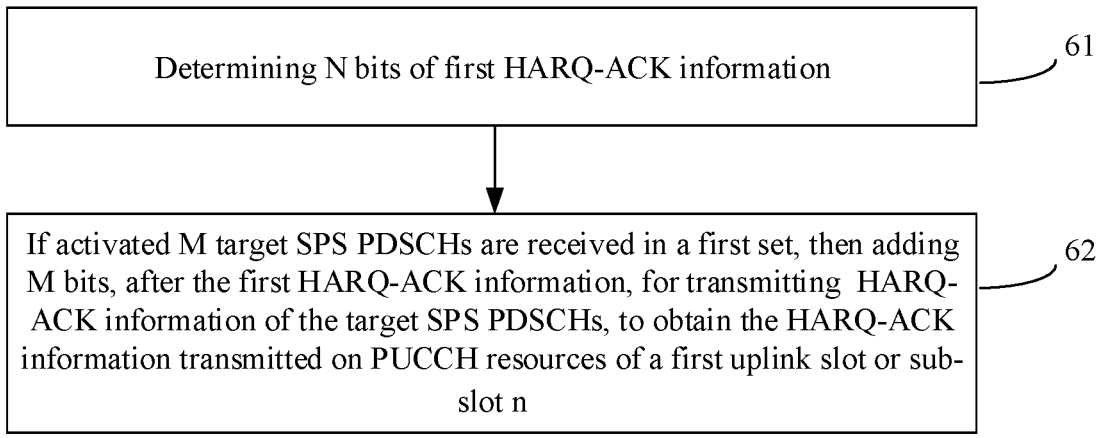
FIG. 6 is a flowchart of a method of determining a dynamic HARQ-ACK codebook according to an embodiment of the present disclosure.

Referring to FIG. 6, the method of determining a dynamic codebook provided in an embodiment of the present disclosure may be applied to a terminal or a base station, for determining a HARQ-ACK codebook of a Semi-Persistent Scheduling Physical Downlink Shared Channel (SPS PDSCH). The following description takes the terminal as an example. Referring to FIG. 6, the method of determining a dynamic HARQ-ACK codebook according to the embodiment of the present disclosure is applied to a terminal side, and includes steps 61-62.

Step 61: determining N bits of first HARQ-ACK information, where the first HARQ-ACK information at least includes HARQ-ACK information for feeding back a PDSCH and/or Semi-Persistent Scheduling Physical Downlink Shared Channel release (SPS PDSCH release) scheduled by downlink control information (DCI).

Here, determining the N bits of the first HARQ-ACK information may specifically include: determining a PDCCH detection opportunity set according to a set of slot timing values or sub-slot timing values and according to slot offset values; detecting Downlink Control Information (DCI) according to the PDCCH detection opportunity set, and according to a counter Data Assignment Indication (counter DAI) and a total Data Assignment Indication (total DAI) in the detected DCI, constructing the N bits of HARQ-ACK information.

The set of slot timing values or sub-slot timing values is used to represent the timing from the PDSCH to the HARQ-ACK, which may be defined in advance, or may be configured by the base station to the terminal through a high-layer signaling. For example, the set of slot timing values or sub-slot timing values may be a K1 set configured by the base station in the related art. The slot offset value is indicated by a time-domain resource allocation field included in the downlink control information, and is used to indicate the timing from the PDCCH to the PDSCH.

Step 62: if activated M target SPS PDSCHs are received in the first set, then adding M bits for transmitting the HARQ-ACK information of the target SPS PDSCHs after the first HARQ-ACK information, to obtain the HARQ-ACK information transmitted on PUCCH resources of a first uplink slot or sub-slot n.

Here, the target SPS PDSCHs belong to the same activated SPS configuration. The first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$.

$K_{1,c}$ is a PDSCH-to-HARQ-feedback timing value corresponding to SPS PDSCH, and T is a first period.

The first period T may be predetermined, or the first period T may be configured by the base station to the terminal through a high-layer signaling, or the first period T may be determined by the terminal according to the first configuration information. The first period T may be an integer, and the first periods corresponding to different subcarrier spacings may be the same or different. Optionally, the first period may be an uplink-downlink conversion period.

Through the above steps, when determining the dynamic HARQ-ACK codebook, the embodiment of the present disclosure adds M bits after the N bits of first HARQ-ACK information, for transmitting HARQ-ACK information of the target SPS PDSCH. A length of the dynamic codebook in the related art is extended, so that the problem of insufficient number of bits of the HARQ-ACK codebook caused by postponing SPS PDSCH HARQ-ACK in the related art is solved by increasing redundant feedback information, thereby avoiding unnecessary retransmission of SPS PDSCH and improving a spectrum efficiency.

In practical applications, the terminal may have a plurality of activated SPS configurations. In this case, in the above step 62, when a plurality of SPS configurations is activated, the first set may include all slots from a slot $n-K_{1,c,p}-T+1$ to a slot $n-K_{1,c,p}$; or, the first set includes all downlink slots from a slot $n-K_{1,c,p}-T+1$ to a slot $n-K_{1,c,p}$.

Here, the $K_{1,c,p}$ is a PDSCH-to-HARQ-feedback timing value corresponding to a SPS PDSCH of the p-th SPS configuration, and the T is a first period.

Similarly, directed to a certain uplink slot or sub-slot (hereinafter referred to as a target uplink slot or target uplink sub-slot for convenience of description), the embodiments of the present disclosure may also determine whether the target uplink slot or the target uplink sub-slot is a first uplink slot or sub-slot n for transmitting HARQ-ACK information, in at least one of the following ways a) to d).

Way a): if the target uplink slot or the target uplink sub-slot does not include any of the target PUCCH resources, then determining that the target uplink slot or the target uplink sub-slot is not the first uplink slot or sub-slot n;

Way b): if the target uplink slot or the target uplink sub-slot does not include any of the target PUCCH resources, and SPS PDSCH reception satisfying the first condition does not exist, then determining that the target uplink slot is not the first uplink slot or sub-slot n;

Way c): if the target uplink slot or the target uplink sub-slot does not include any of the target PUCCH resources and SPS PDSCH reception satisfying the first condition exists, then determining that the target uplink slot or the target uplink sub-slot is the first uplink slot or sub-slot n, and transmitting a HARQ-ACK codebook using PUCCH resources configured by a base station for the SPS PDSCH through a high-layer signaling;

Way d): if the target uplink slot or the target uplink sub-slot includes any of the target PUCCH resources and SPS PDSCH reception satisfying the first condition does not exist, then determining that the target uplink slot is not the first uplink slot or sub-slot n.

The target PUCCH resources are PUCCH resources indicated by a PDSCH-to-HARQ-feedback timing indicator and a PUCCH resource indicator included in downlink control information; the first condition is that at least one symbol in HARQ-ACK resources corresponding to the SPS PDSCH is configured or indicated to be downlink or flexible, and most adjacent uplink slot or sub-slot after the HARQ-ACK resources is the target uplink slot or target uplink sub-slot.

When it is determined that the target uplink slot or target uplink sub-slot is a first uplink slot or sub-slot n for transmitting HARQ-ACK information, the embodiments of the present disclosure may determine the HARQ-ACK information (i.e., the determined HARQ-ACK codebook) transmitted in the target uplink slot or target uplink sub-slot, in the manner of steps 61 to 62. However, when it is determined that the target uplink slot or target uplink sub-slot is not the first uplink slot or sub-slot n for transmitting the HARQ-ACK information, the embodiments of the present disclosure may execute the step 61 directly, and take the N bits of first HARQ-ACK information obtained in the step 61, as the HARQ-ACK information received on the target uplink slot or the target uplink sub-slot.

Still taking FIG. 3 as an example, assuming that K1 set={1, 2, 3, 4} and K1 indicated in the activation DCI=4 (K1=4), then the HARQ-ACK codebook fed back on an uplink slot UL #10 includes HARQ-ACK information corresponding to SPS PDSCH transmitted on DL #2 to DL #6. In this way, a bit of transmitting feedback information may be reserved on UL #10 for DL #2 to DL #6.

Figure 7:
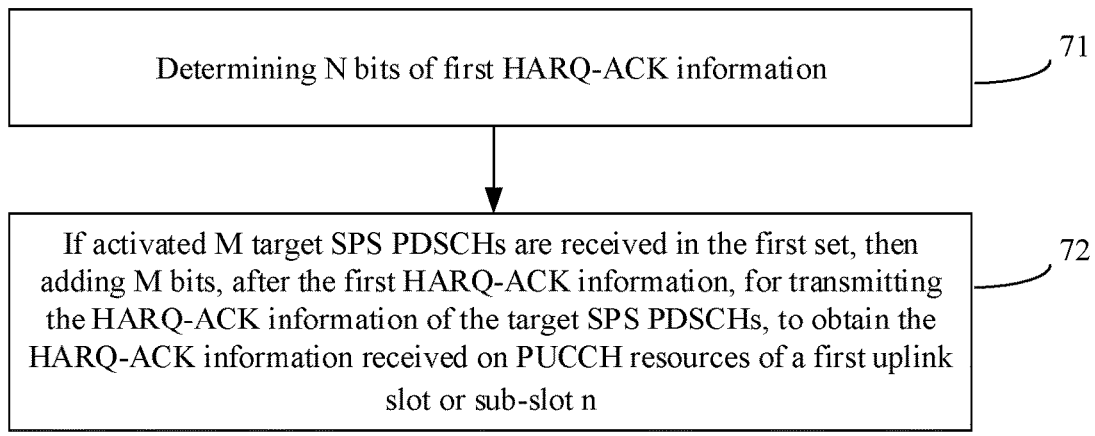
FIG. 7 is another flowchart of a method of determining a dynamic HARQ-ACK codebook according to an embodiment of the present disclosure.

Referring to FIG. 7, the method of determining the dynamic HARQ-ACK codebook according to the embodiment of the present disclosure is applied to the base station side, the method includes steps 71-72.

Step 71: determining N bits of first HARQ-ACK information by the base station, where the first HARQ-ACK information at least includes HARQ-ACK information for feeding back a PDSCH and/or Semi-Persistent Scheduling Physical Downlink Shared Channel release (SPS PDSCH release) scheduled by downlink control information (DCI).

Step 72: if activated M target SPS PDSCHs are received in the first set, then adding M bits for transmitting the HARQ-ACK information of the target SPS PDSCHs after the first HARQ-ACK information, to obtain the HARQ-ACK information received on PUCCH resources of a first uplink slot or sub-slot n.

Here, the target SPS PDSCHs belong to the same activated SPS configuration. The first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$. $K_{1,c}$ is a PDSCH-to-HARQ-feedback timing value corresponding to SPS PDSCH, and T is a first period.

When a plurality of SPS configurations is activated, the first set may include all slots from a slot $n-K_{1,c,p}-T+1$ to a slot $n-K_{1,c,p}$; or, the first set includes all downlink slots from a slot $n-K_{1,c,p}-T+1$ to a slot $n-K_{1,c,p}$. Here, the $K_{1,c,p}$ is a PDSCH-to-HARQ-feedback timing value corresponding to a SPS PDSCH of the p-th SPS configuration, and the T is a first period.

For more details of the method of determining the dynamic HARQ-ACK codebook at the base station side in the embodiment of the present disclosure, reference may be made to the detailed description of the method implemented at the terminal side, and is not repeated here for purpose of brevity.

In the embodiment of the present disclosure, when determining a semi-static codebook or a dynamic codebook, and if a PUCCH and a PUSCH of at least two different priority levels collide, uplink transmission (UL transmission) with a low priority level overlapping with a high priority level may be dropped first, and then whether the PUCCH and the PUSCH are multiplexed is judged.

Various methods of the embodiments of the present disclosure have been described above. A device for carrying out the above methods will be further provided below.

Figure 8:
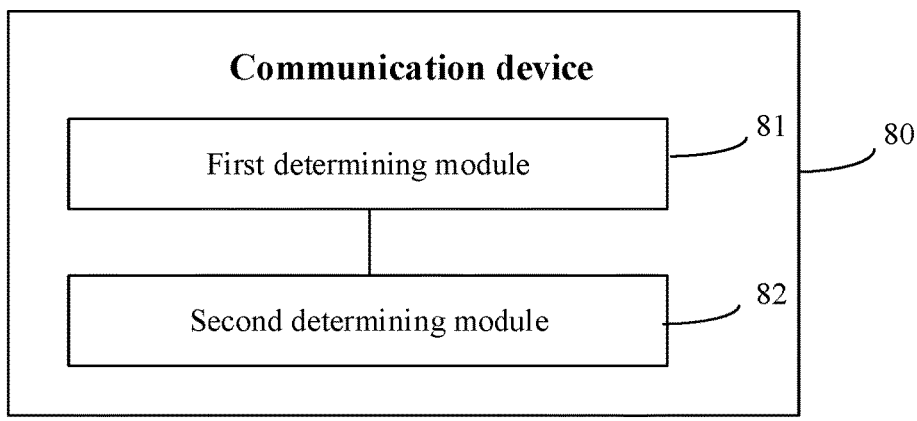
FIG. 8 is a schematic structural diagram of a communication device provided in an embodiment of the present disclosure.

Referring to FIG. 8, an embodiment of the present disclosure provides a communication device 80, which may specifically be a terminal or a base station. as shown in FIG. 8, the communication device 80 includes: a first determining module 81, configured to determine a first set of candidate PDSCH reception opportunities according to first information by the terminal; a second determining module 82, configured to determine HARQ-ACK information or a HARQ-ACK codebook transmitted ore received on a PUCCH resource of the first uplink slot or sub-slot n according to the first set.

The first information includes at least one of the following information: A) a set of slot timing values or sub-slot timing values $K_{1,1}, K_{1,2}, \ldots K_{1,N}$ used to represent the timing from PDSCH to HARQ-ACK; B) first configuration information, wherein the first configuration information includes uplink-downlink configuration information at a cell level or at a user level.

Here, when the communication device 80 is a terminal, the second determining module 82 determines the HARQ-ACK information or the HARQ-ACK codebook transmitted on the PUCCH resource of the first uplink slot or sub-slot n. When the communication device 80 is a base station, the second determining module 82 determines the HARQ-ACK information or the HARQ-ACK codebook received on the PUCCH resource of the first uplink slot or the sub-slot n.

Optionally, the first determining module 81 is further configured to: determine a second timing value set $\{K_{1,i}, K_{1,i}+1, \ldots K_{1,i}+T-1\}$ for each timing value $K_{1,i}$ in the set of slot timing values or sub-slot timing values, and obtain a plurality of second timing value sets, wherein T is a first period; determine a first timing value set including all timing values in the plurality of second timing value sets; and determine a first set of candidate PDSCH reception opportunities based on the first timing value set.

Optionally, the first determining module 81 is further configured to: determine a first set of candidate PDSCH reception opportunities according to a first timing value set, wherein timing values in the first timing value set belong to at least one of the following: $\{K_{1,i}, K_{1,i}+1, \ldots, K_{1,i}+T-1\}$, i=1 . . . N, N is the total number of timing values included in the set of slot timing values or sub-slot timing values, and T is a first period.

Optionally, the first determining module 81 is further configured to: determine a first set of candidate PDSCH reception opportunities according to a first timing value set, wherein the first timing value set includes all positive integers from min{$K_{1,i}$} to max {$K_{1,i}$+T−1}, the T is the first period.

Optionally, the first determining module is further configured to, when determining the first set of candidate PDSCH reception opportunities according to the first timing value set, traverse each timing value $K_{1,x}$ in the first timing value set, and determine at least one first downlink slot corresponding to a first uplink slot or sub-slot n according to the timing value $K_{1,x}$, and judge whether a certain time-domain resource allocation exists in the first downlink slot according to the uplink-downlink configuration information, wherein each symbol in the certain time-domain resource allocation is not configured as uplink by the uplink-downlink configuration information, and if the certain time-domain resource allocation exists, then at least one candidate PDSCH reception opportunity is added in the first set, wherein, the certain time-domain resource allocation is configured by the base station through a high-layer signaling, or is pre-agreed.

Optionally, the second determining module 82 is further configured to, for each PDSCH reception opportunity in the first set, reserve at least one bit, in the HARQ-ACK information, for feeding back HARQ-ACK corresponding to the PDSCH reception opportunity.

Optionally, the first period T is predetermined in advance; or, the first period T is configured by the base station through a high-layer signaling; or, the first period T is determined according to the first configuration information.

Optionally, the first period T is an integer, and the first periods corresponding to different subcarrier spacings are the same or different.

Optionally, the set of slot timing values or sub-slot timing values are predefined, or configured by the base station through a high-layer signaling.

Optionally, the first configuration information includes the following Information Elements (IE) configured by the base station through a high-layer signaling: TDD-UL-DL-ConfigurationCommon and/or TDD-UL-DL-ConfigDedicated.

Optionally, the communication device further includes the following module (not shown in the figure): a third determining module configured to, for a target uplink slot or a target uplink sub-slot, determine whether the target uplink slot or the target uplink sub-slot is a first uplink slot or sub-slot n for transmitting or receiving the HARQ-ACK information in any one of the following ways: a) to d): a) if the target uplink slot or the target uplink sub-slot does not include any of the target PUCCH resources, then determining that the target uplink slot or the target uplink sub-slot is not the first uplink slot or sub-slot n; b) if the target uplink slot or the target uplink sub-slot does not include any of the target PUCCH resources, and SPS PDSCH reception satisfying a first condition does not exist, then determining that the target uplink slot is not the first uplink slot or sub-slot n; c) if the target uplink slot or the target uplink sub-slot does not include any of the target PUCCH resources and a SPS PDSCH reception satisfying the first condition exists, then determining that the target uplink slot or the target uplink sub-slot is the first uplink slot or sub-slot n, and transmitting a HARQ-ACK codebook using PUCCH resources configured by a base station for the SPS PDSCH through a high-layer signaling; d): if the target uplink slot or the target uplink sub-slot includes any of the target PUCCH resources and SPS PDSCH reception satisfying the first condition does not exist, then determining that the target uplink slot is not the first uplink slot or sub-slot n; wherein the target PUCCH resources are PUCCH resources indicated by a PDSCH-to-HARQ-feedback timing indicator and a PUCCH resource indicator included in downlink control information; the first condition is that at least one symbol in HARQ-ACK resources corresponding to the SPS PDSCH is configured or indicated to be downlink or flexible, and most adjacent uplink slot or sub-slot after the HARQ-ACK resources is the target uplink slot or target uplink sub-slot.

Figure 9:
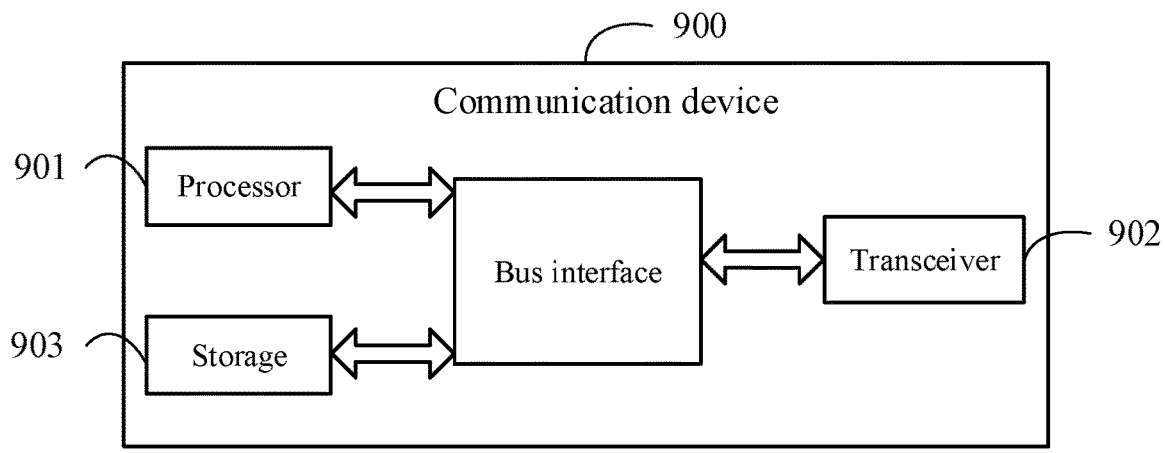
FIG. 9 is another structural diagram of a communication device provided in an embodiment of the present disclosure.

Referring to FIG. 9, FIG. 9 is another structural schematic diagram of a communication device provided by an embodiment of the present disclosure, the communication device may be a terminal or a base station, the communication device 900 includes a processor 901, a transceiver 902, a storage 903 and a bus interface, wherein: in this embodiment of that present disclosure, the communication device 900 further includes a program stored on the storage 903 and executable on the processor 901; when the program is executed by the processor 901, the processor 901 implements following steps: determining a first set of candidate PDSCH reception opportunities according to first information; determining HARQ-ACK information or a HARQ-ACK codebook transmitted ore received on a PUCCH resource of the first uplink slot or sub-slot n according to the first set.

The first information includes at least one of the following information: A) a set of slot timing values or sub-slot timing values $K_{1,1}$, $K_{1,2}$, ... $K_{1,N}$ used to represent the timing from PDSCH to HARQ-ACK; B) first configuration information, wherein the first configuration information includes uplink-downlink configuration information at a cell level or at a user level.

Here, when the communication device 900 is a terminal, what is determined when the program is executed by the processor 901 is the HARQ-ACK information or the HARQ-ACK codebook transmitted on the PUCCH resource of the first uplink slot or sub-slot n. When the communication device 900 is a base station, what is determined when the program is executed by the processor 901 is the HARQ-ACK information or the HARQ-ACK codebook received on the PUCCH resource of the first uplink slot or sub-slot n.

It can be understood that, in the embodiment of the present disclosure, when the program is executed by the processor 901, each process of the method of determining a Hybrid Automatic Repeat reQuest (HARD) codebook in the embodiments shown in FIG. 4 or FIG. 5 can be implemented, and the same technical effect can be achieved. Detailed description is not repeated in order to avoid repetition.

In FIG. 9, a bus architecture may include any number of interconnected buses and bridges, specifically various circuits such as one or more processors represented by the processor 901 and a memory represented by the storage 903 are linked together. The bus architecture may also link together various other circuits, such as peripheral devices, voltage regulators, and power management circuits, which are well known in the art and, therefore, will not be described further herein. A bus interface provides an interface. The transceiver 902 may be a number of elements, including a transmitter and a receiver, for providing means for communicating with various other devices over a transmission medium.

The processor 901 is responsible for managing the bus architecture and general processing, and the storage 903 may store data used by the processor 901 when performing operations.

In some embodiments of the present disclosure, there is also provided a computer readable storage medium having stored thereon a program. When the program is executed by a processor, the processor implements the following steps: determining a first set of candidate PDSCH reception opportunities according to first information; determining HARQ-ACK information or a HARQ-ACK codebook transmitted ore received on a PUCCH resource of the first uplink slot or sub-slot n according to the first set.

The first information includes at least one of the following information: A) a set of slot timing values or sub-slot timing values $K_{1,1}, K_{1,2}, \ldots K_{1,N}$ used to represent the timing from PDSCH to HARQ-ACK; B) first configuration information, wherein the first configuration information includes uplink-downlink configuration information at a cell level or at a user level.

When the program is executed by the processor, the processor can realize all the above-mentioned implementations in the method of determining the semi-static Hybrid Automatic Repeat reQuest codebook, and the same technical effect can be achieved, and is not repeated here for avoiding repetition.

Figure 10:
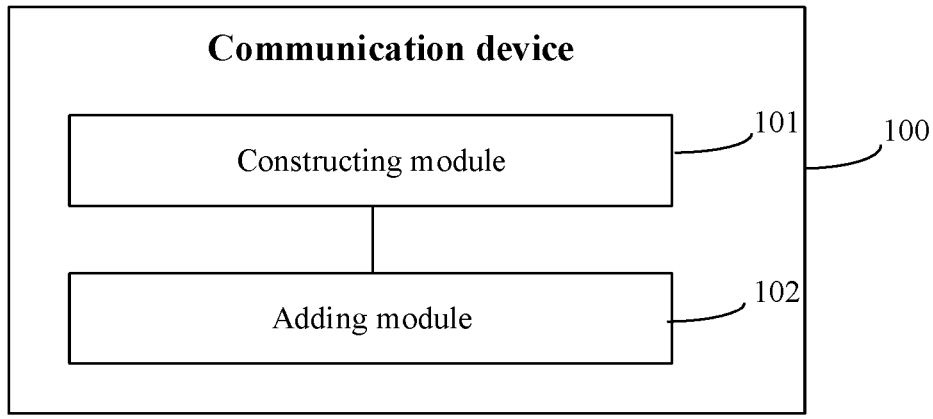
FIG. 10 is another structural diagram of a communication device provided in an embodiment of the present disclosure.

Referring to FIG. 10, an embodiment of the present disclosure provides a communication device 100. The communication device 100 may be a terminal or a base station. as shown in FIG. 10, the communication device 100 includes: a third determining module 101 configured to determine N bits of first HARQ-ACK information, where the first HARQ-ACK information at least includes HARQ-ACK information for feeding back a PDSCH and/or Semi-Persistent Scheduling Physical Downlink Shared Channel release (SPS PDSCH release) scheduled by downlink control information (DCI); an adding module 102 configured to: if activated M target SPS PDSCHs are received in the first set, then add M bits for transmitting the HARQ-ACK information of the target SPS PDSCHs after the first HARQ-ACK information, to obtain the HARQ-ACK information transmitted or received on PUCCH resources of a first uplink slot or sub-slot n.

The first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$. $K_{1,c}$ is a PDSCH-to-HARQ-feedback timing value corresponding to SPS PDSCH, and T is a first period.

Here, when the communication device 100 is a terminal, the adding module 102 obtains the HARQ-ACK information or the HARQ-ACK codebook transmitted on the PUCCH resource of the first uplink slot or sub-slot n. When the communication device 100 is a base station, the adding module 102 obtains the HARQ-ACK information or the HARQ-ACK codebook received on the PUCCH resource of the first uplink slot or sub-slot n.

Optionally, the target SPS PDSCHs belong to the same activated SPS configuration.

Optionally, the third determining module 101 is further configured to determine a PDCCH detection opportunity set according to a set of slot timing values or sub-slot timing values and according to slot offset values; detect Downlink Control Information (DCI) according to the PDCCH detection opportunity set, and according to a counter Data Assignment Indication (counter DAI) and a total Data Assignment Indication (total DAI) in the detected DCI, construct the N bits of HARQ-ACK information.

The set of slot timing values or sub-slot timing values is used to represent the timing from the PDSCH to the HARQ-ACK. The slot offset value is indicated by a time-domain resource allocation field included in the downlink control information, and is used to indicate the timing from the PDCCH to the PDSCH.

Optionally, the first period T is predetermined; or, the first period T is configured by the base station through a high-layer signaling; or, the first period T is determined according to the first configuration information.

Optionally, the communication device further includes the following module (not shown in the figure): a fourth determining module configured to, for the target uplink slot or the target uplink sub-slot, determine whether the target uplink slot or the target uplink sub-slot is a first uplink slot or sub-slot n for transmitting HARQ-ACK information, in at least one of the following ways a) to d): a) if the target uplink slot or the target uplink sub-slot does not include any of the target PUCCH resources, then determining that the target uplink slot or the target uplink sub-slot is not the first uplink slot or sub-slot n; b) if the target uplink slot or the target uplink sub-slot does not include any of the target PUCCH resources, and SPS PDSCH reception satisfying the first condition does not exist, then determining that the target uplink slot is not the first uplink slot or sub-slot n; c) if the target uplink slot or the target uplink sub-slot does not include any of the target PUCCH resources and SPS PDSCH reception satisfying the first condition exists, then determining that the target uplink slot or the target uplink sub-slot is the first uplink slot or sub-slot n, and transmitting a HARQ-ACK codebook using PUCCH resources configured by a base station for the SPS PDSCH through a high-layer signaling; d) if the target uplink slot or the target uplink sub-slot includes any of the target PUCCH resources and SPS PDSCH reception satisfying the first condition does not exist, then determining that the target uplink slot is not the first uplink slot or sub-slot n.

The target PUCCH resources are PUCCH resources indicated by a PDSCH-to-HARQ-feedback timing indicator and a PUCCH resource indicator included in downlink control information; the first condition is that at least one symbol in HARQ-ACK resources corresponding to the SPS PDSCH is configured or indicated to be downlink or flexible, and most adjacent uplink slot or sub-slot after the HARQ-ACK resources is the target uplink slot or target uplink sub-slot.

Figure 11:
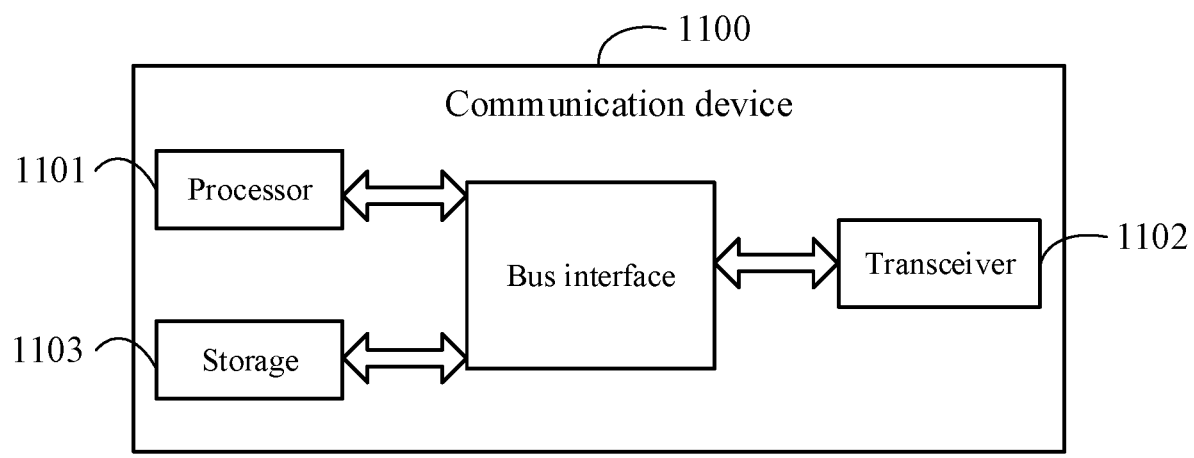
FIG. 11 is another structural diagram of a communication device provided in an embodiment of the present disclosure.

Referring to FIG. 11, FIG. 11 is another structural diagram of a communication device provided in an embodiment of the present disclosure, wherein the communication device may be a terminal or a base station, the communication device 1100 includes a processor 1101, a transceiver 1102, a storage 1103 and a bus interface.

In this embodiment of that present disclosure, the communication device 1100 further includes a program stored on the storage 1103 and executable by the processor 1101, and when the program is executed by the processor 1101, the processor 1101 implements the following steps: determining N bits of first HARQ-ACK information, where the first HARQ-ACK information at least includes HARQ-ACK information for feeding back a PDSCH and/or Semi-Persistent Scheduling Physical Downlink Shared Channel release (SPS PDSCH release) scheduled by downlink control information (DCI); if activated M target SPS PDSCHs are received in the first set, then adding M bits for transmitting the HARQ-ACK information of the target SPS PDSCHs after the first HARQ-ACK information, to obtain the HARQ-ACK information transmitted on PUCCH resources of a first uplink slot or sub-slot n.

The first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$. $K_{1,c}$ is a PDSCH-to-HARQ-feedback timing value corresponding to SPS PDSCH, and T is a first period.

Here, when the communication device 1100 is a terminal, what is determined when the program is executed by the processor 1101 is the HARQ-ACK information or the HARQ-ACK codebook transmitted on the PUCCH resources of the first uplink slot or sub-slot n. When the communication device 1100 is a base station, what is determined when the program is executed by the processor 1101 is the HARQ-ACK information or the HARQ-ACK codebook received on the PUCCH resources of the first uplink slot or sub-slot n.

It can be understood that, in the embodiments of the present disclosure, when the program is executed by the processor 1101, each process of the method of determining a Hybrid Automatic Repeat reQuest (HARD) codebook in the embodiments shown in FIG. 6 or FIG. 7 may be implemented, and the same technical effect can be achieved. Detailed description is not repeated to avoid repetition.

In FIG. 11, a bus architecture may include any number of interconnected buses and bridges, specifically various circuits such as one or more processors represented by the processor 1101 and a memory represented by the storage 1103 are linked together. The bus architecture may also link together various other circuits, such as peripheral devices, voltage regulators, and power management circuits, which are well known in the art and, therefore, will not be described further herein. A bus interface provides an interface. The transceiver 1102 may be a number of elements, including a transmitter and a receiver, for providing means for communicating with various other devices over a transmission medium.

The processor 1101 is responsible for managing the bus architecture and general processing, and the storage 1103 may store data used by the processor 1101 in performing operations.

In some embodiments of the present disclosure, there is also provided a computer-readable storage medium having stored thereon a program. When the program is executed by a processor, the processor implements following steps: determining N bits of first HARQ-ACK information where the first HARQ-ACK information at least includes HARQ-ACK information for feeding back a PDSCH and/or Semi-Persistent Scheduling Physical Downlink Shared Channel release (SPS PDSCH release) scheduled by downlink control information (DCI); if activated M target SPS PDSCHs are received in the first set, then adding M bits for transmitting the HARQ-ACK information of the target SPS PDSCHs after the first HARQ-ACK information, to obtain the HARQ-ACK information transmitted on PUCCH resources of a first uplink slot or sub-slot n.

The first set consists of all slots from a slot $n-K_{1,c}-T+1$ to a slot $n-K_{1,c}$, or the first set consists of all downlink slots from a slot $n-K_{1,c}-T+1$ to a slot $n-K_{1,c}$. $K_{1,c}$ is a PDSCH-to-HARQ-feedback timing value corresponding to SPS PDSCH, and T is a first period.

When the program is executed by the processor, the processor can realize all the above-mentioned implementations in the method of determining the dynamic Hybrid Automatic Repeat reQuest codebook, and can achieve the same technical effect. Detailed description is not repeated here for avoiding repetition.

Those of ordinary skills in the art will recognize that exemplary elements and algorithm steps described in connection with the embodiments disclosed herein can be implemented in electronic hardware, or a combination of computer software and electronic hardware. Whether these functions are executed in hardware or software depends on a specific application and design constraints of the technical solution. One skilled in the art may use different methods to implement the described functions for each particular application, but such implementation should not be considered to go beyond the scope of the present disclosure.

Those skilled in the art will clearly appreciate that, for convenience and simplicity of description, reference may be made to corresponding processes in the foregoing method embodiments for obtaining specific working processes of systems, devices and units described above, which will not be repeated here.

In the embodiments provided herein, it should be understood that the disclosed devices and methods may be implemented in other ways. For example, the device embodiments described above are merely illustrative, for example, a division of the units is only a logical function division, and there may be other division modes in actual implementation. For example, multiple units or components may be combined or may be integrated into another system, or some features may be omitted or not performed. Optionally, coupling or direct coupling or communication connection shown or discussed may be an indirect coupling or communication connection through some interfaces, devices or units, which may be in an electrical, mechanical or other form.

The units described as separate components may or may not be physically separated, and components displayed as units may or may not be physical units, i.e. may be located in one place, or may be distributed over multiple network elements. Some or all of the units may be selected according to actual needs to achieve the purpose of the embodiments of the present disclosure.

In addition, each functional unit in each embodiment of the present disclosure may be integrated in one processing unit, each unit may exist physically separately, or two or more unit may be integrated in one unit.

The functions, if implemented in the form of software functional units and sold or used as separate products, may be stored in a computer readable storage medium. Based on this understanding, an essential part, or a part contributing to the related art, or a part, in the technical solutions of the present disclosure may be embodied in the form of a software product, the computer software product is stored in a storage medium and includes instructions for causing a computer device (may be a personal computer, a server, or a network device or the like) to perform all or part of the steps of the methods described in various embodiments of the present disclosure. The aforementioned storage media include various media that can store program codes such as a U disk, a removable hard disk, ROM, RAM, a magnetic disk or an optical disk, or the like.

Those of ordinary skills in the art can understand that all or part of the processes in the method of implementing the above embodiments can be performed by controlling the relevant hardware by a program, the program may be stored in a computer-readable storage medium, and when the program is executed, the processes of the embodiments of the methods described above may be implements. The storage medium may be a magnetic disk, an optical disk, a Read-Only Memory (ROM) or a Random Access Memory (RAM), or the like.

It is understood that the embodiments of the present disclosure may be implemented in hardware, software, firmware, middleware, microcode, or combinations thereof. For hardware implementations, modules, units, sub-units may be implemented in one or more of Application Specific Integrated Circuits (ASICs), Digital Signal Processors (DSPs), DSP devices (DSPD), a Programmable Logic Device (PLD), a Field-Programmable Gate Array (FPGA), a general purpose processor, controllers, microcontrollers, microprocessors, other electronic units for performing the functions described herein, or combinations thereof.

For software implementations, the techniques described in embodiments of the present disclosure may be implemented by modules (, e.g., procedures, functions, etc.) that perform the functions described in embodiments of the present disclosure. Software codes may be stored in a memory and executed by a processor, the memory may be implemented in the processor or external to the processor.

The above description is only specific embodiments of the present disclosure, but the protection scope of the present disclosure is not limited thereto, and any variation or substitution that is readily contemplated by a person skilled in the art within the technical scope of the present disclosure are within the protection scope of the present disclosure. Therefore, the protection scope of the present disclosure should be consistent with the protection scope of the claims.

What is claimed is:

1. A method of determining a Hybrid Automatic Repeat reQuest-Acknowledgement (HARQ-ACK) codebook performed by a terminal, comprising:
   determining a first set of candidate Physical Downlink Shared Channel (PDSCH) reception opportunities according to first information;
   determining, according to the first set, HARQ-ACK information transmitted on Physical Uplink Control Channel (PUCCH) resources of a first uplink slot or sub-slot n or a HARQ-ACK codebook transmitted on PUCCH resources of a first uplink slot or sub-slot n;
   determining that an uplink slot or an uplink sub-slot is the first uplink slot or sub-slot n, wherein the uplink slot or the uplink sub-slot does not comprise any PUCCH resources indicated by a PDSCH-to-HARQ-feedback timing indicator and a PUCCH resource indicator included in downlink control information, and Semi-Persistent Scheduling (SPS) PDSCH reception satisfying a first condition exists;
   wherein the first information comprises at least one of following information:
      a set of slot timing values or sub-slot timing values $K_{1,1}, K_{1,2}, \ldots, K_{1,N}$ used to represent a timing from a PDSCH to a HARQ-ACK;
      first configuration information, wherein the first configuration information comprises uplink-downlink configuration information at a cell level or at a user level;
   wherein the first condition is that at least one symbol in a HARQ-ACK resource corresponding to the SPS PDSCH is configured or indicated to be downlink or flexible, and most adjacent uplink slot or sub-slot after the HARQ-ACK resource is the uplink slot or uplink sub-slot.

2. The method according to claim 1, wherein determining the first set of candidate PDSCH reception opportunities according to the first information comprises:
   determining a second timing value set $\{K_{1,i}, K_{1,i}+1, \ldots, K_{1,i}+T-1\}$ for each timing value $K_{1,i}$ in the set of slot timing values or sub-slot timing values, and obtaining a plurality of second timing value sets, wherein T is a first period;
   determining a first timing value set comprising all timing values in the plurality of second timing value sets; and
   determining the first set of candidate PDSCH reception opportunities based on the first timing value set.

3. The method according to claim 2, wherein determining the first set of candidate PDSCH reception opportunities according to the first timing value set comprises:
   traversing each timing value $K_{1,x}$ in the first timing value set;
   determining at least one first downlink slot corresponding to a first uplink slot or sub-slot n according to the timing value $K_{1,x}$;
   judging whether a certain time-domain resource allocation exists in the at least one first downlink slot according to the uplink-downlink configuration information, wherein each symbol in the certain time-domain resource allocation is not configured as uplink by the uplink-downlink configuration information;
   if the certain time-domain resource allocation exists, then adding at least one candidate PDSCH reception opportunity into the first set, wherein, the certain time-domain resource allocation is configured by a base station through a high-layer signaling, or is pre-agreed.

4. The method according to claim 2, wherein,
   the first period T is predetermined; or,
   the first period T is configured by a base station through a high-layer signaling; or,
   the first period T is determined according to the first configuration information.

5. The method according to claim 2, wherein,
   the first period T is an integer, and first periods corresponding to different subcarrier spacings are different.

6. The method according to claim 1, wherein determining the first set of candidate PDSCH reception opportunities according to the first information comprises:
   determining the first set of candidate PDSCH reception opportunities according to a first timing value set, wherein timing values in the first timing value set belong to at least one of following: $\{K_{1,i}, K_{1,i}+1, \ldots, K_{1,i}+T-1\}$, $i=1 \ldots N$, N is a total quantity of timing values comprised in the set of slot timing values or sub-slot timing values, and T is a first period.

7. The method according to claim 1, wherein determining the first set of candidate PDSCH reception opportunities according to the first information comprises:
   determining the first set of candidate PDSCH reception opportunities according to a first timing value set, wherein the first timing value set comprises all positive integers from $\min\{K_{1,i}\}$ to $\max\{K_{1,i}+T-1\}$, T is a first period.

8. The method according to claim 1, wherein determining, according to the first set, the HARQ-ACK information transmitted on PUCCH resources of the first uplink slot or sub-slot n or the HARQ-ACK codebook transmitted on PUCCH resources of the first uplink slot or sub-slot n comprises:
   for each PDSCH reception opportunity in the first set, reserving at least one bit in the HARQ-ACK information, for feeding back HARQ-ACK corresponding to the PDSCH reception opportunity.

9. The method according to claim 1, wherein the set of slot timing values or sub-slot timing values is predefined, or is configured by a base station through a high-layer signaling.

10. The method according to claim 1, wherein the first configuration information comprises following Information Elements (IE) configured by a base station through a high-layer signaling:
   Time-Division-Duplex (TDD)-Uplink (UL)-Downlink (DL)-ConfigurationCommon, and/or,
   TDD-UL-DL-ConfigDedicated.

11. The method according to claim 1, further comprising at least one of following:
  determining that an uplink slot or an uplink sub-slot is the first uplink slot or sub-slot n, wherein the uplink slot or the uplink sub-slot comprises any of target PUCCH resources;
  determining that an uplink slot or an uplink sub-slot is the first uplink slot or sub-slot n, wherein the uplink slot or the uplink sub-slot does not comprise any of target PUCCH resources, Semi-Persistent Scheduling (SPS) PDSCH reception satisfying a first condition exists, and a HARQ-ACK codebook is transmitted using PUCCH resources configured by a base station for a SPS PDSCH through a high-layer signaling;
  determining that an uplink slot or an uplink sub-slot is the first uplink slot or sub-slot n, wherein the uplink slot or the uplink sub-slot comprises any of target PUCCH resources or SPS PDSCH reception satisfying a first condition exists;
  wherein the target PUCCH resources are PUCCH resources indicated by a PDSCH-to-HARQ-feedback timing indicator and a PUCCH resource indicator comprised in Downlink Control Information.

12. A communication device, the communication device being a terminal, comprising:
  a processor, a storage and a program stored on the storage and executable by the processor, wherein, when the program is executed by the processor, the processor implements steps of the method according to claim 1.

13. A non-transitory computer readable storage medium, comprising:
  a program stored on the computer readable storage medium, wherein when the program is executed by a processor, the processor implements steps of the method according to claim 1.

14. A method of determining a Hybrid Automatic Repeat reQuest-Acknowledgement (HARQ-ACK) codebook performed by a base station, comprising:
  determining a first set of candidate Physical Downlink Shared Channel (PDSCH) reception opportunities according to first information;
  determining, according to the first set, HARQ-ACK information received on Physical Uplink Control Channel (PUCCH) resources of a first uplink slot or sub-slot n or a HARQ-ACK codebook received on PUCCH resources of a first uplink slot or sub-slot n;
  determining that an uplink slot or an uplink sub-slot is the first uplink slot or sub-slot n, wherein the uplink slot or the uplink sub-slot does not comprise any of target PUCCH resources indicated by a PDSCH-to-HARQ-feedback timing indicator and a PUCCH resource indicator included in downlink control information, or and Semi-Persistent Scheduling (SPS) PDSCH reception satisfying a first condition exists;
  wherein the first information comprises at least one of following information:
    a set of slot timing values or sub-slot timing values $K_{1,1}, K_{1,2}, \ldots, K_{1,N}$ used to represent a timing from a PDSCH to a HARQ-ACK;
    first configuration information, wherein the first configuration information comprises uplink-downlink configuration information at a cell level or at a user level;
  wherein the first condition is that at least one symbol in a HARQ-ACK resource corresponding to the SPS PDSCH is configured or indicated to be downlink or flexible, and most adjacent uplink slot or sub-slot after the HARQ-ACK resource is the uplink slot or uplink sub-slot.

15. The method according to claim 14, further comprising at least one of following:
  determining that an uplink slot or an uplink sub-slot is the first uplink slot or sub-slot n, wherein the uplink slot or the uplink sub-slot comprises any of target PUCCH resources;
  determining that an uplink slot or an uplink sub-slot is the first uplink slot or sub-slot n, wherein the uplink slot or the uplink sub-slot does not comprise any of target PUCCH resources, Semi-Persistent Scheduling (SPS) PDSCH reception satisfying a first condition exists, and a HARQ-ACK codebook is transmitted using PUCCH resources configured by a base station for a SPS PDSCH through a high-layer signaling;
  determining that an uplink slot or an uplink sub-slot is the first uplink slot or sub-slot n, wherein the uplink slot or the uplink sub-slot comprises any of target PUCCH resources or SPS PDSCH reception satisfying a first condition exists;
  wherein the target PUCCH resources are PUCCH resources indicated by a PDSCH-to-HARQ-feedback timing indicator and a PUCCH resource indicator comprised in Downlink Control Information.

16. A communication device, the communication device being a base station, comprising:
  a processor, a storage and a program stored on the storage and executable by the processor, wherein, when the program is executed by the processor, the processor implements steps of the method according to claim 14.

17. A non-transitory computer readable storage medium, comprising:
  a program stored on the computer readable storage medium, wherein when the program is executed by a processor, the processor implements steps of the method according to claim 14.

18. The method according to claim 14, wherein the first configuration information comprises following Information Elements (IE) configured by a base station through a high-layer signaling:
  Time-Division-Duplex (TDD)-Uplink (UL)-Downlink (DL)-ConfigurationCommon, and/or,
  TDD-UL-DL-ConfigDedicated.

* * * * *

UNITED STATES PATENT AND TRADEMARK OFFICE
CERTIFICATE OF CORRECTION

PATENT NO. : 12,081,340 B2  
APPLICATION NO. : 17/775348  
DATED : September 3, 2024  
INVENTOR(S) : Zhang et al.

Page 1 of 1

It is certified that error appears in the above-identified patent and that said Letters Patent is hereby corrected as shown below:

On the Title Page

Item (73) Assignee, Please change "China Mobile Communication Co., Ltd Research Institute China Mobile Communications Group Co., Beijing (CN)" to --China Mobile Communication Co., Ltd Research Institute, Beijing (CN); China Mobile Communications Group CO., Ltd., Beijing (CN--.

Signed and Sealed this  
Fourth Day of November, 2025

John A. Squires  
*Director of the United States Patent and Trademark Office*